US012485130B2

(12) United States Patent
Gupta et al.

(10) Patent No.: US 12,485,130 B2
(45) Date of Patent: Dec. 2, 2025

(54) CANNABIDIOL INFUSED FOAM ELEMENT OR SURFACE

(71) Applicant: Future Foam, Inc., Council Bluffs, IA (US)

(72) Inventors: Anshul Gupta, Fullerton, CA (US); Michael Blatt, Council Bluffs, IA (US)

(73) Assignee: FUTURE FOAM, INC., Council Bluffs, IA (US)

(*) Notice: Subject to any disclaimer, the term of this patent is extended or adjusted under 35 U.S.C. 154(b) by 1020 days.

(21) Appl. No.: 17/611,724

(22) PCT Filed: May 15, 2020

(86) PCT No.: PCT/US2020/033082
§ 371 (c)(1),
(2) Date: Nov. 16, 2021

(87) PCT Pub. No.: WO2020/236564
PCT Pub. Date: Nov. 26, 2020

(65) Prior Publication Data
US 2022/0233464 A1 Jul. 28, 2022

Related U.S. Application Data

(60) Provisional application No. 62/849,687, filed on May 17, 2019.

(51) Int. Cl.
A61K 31/00 (2006.01)
A47G 9/00 (2006.01)

(52) U.S. Cl.
CPC ............ *A61K 31/658* (2023.05); *A47G 9/007* (2013.01)

(58) Field of Classification Search
CPC ....... A61K 31/05; A61K 31/658; A47G 9/007
See application file for complete search history.

(56) References Cited

U.S. PATENT DOCUMENTS

| 6,328,992 B1 | 12/2001 | Brooke et al. |
| 2014/0053338 A1 | 2/2014 | White |
| 2017/0037215 A1 | 2/2017 | Crawford et al. |

FOREIGN PATENT DOCUMENTS

GB  2385271 A  8/2003

OTHER PUBLICATIONS

USPTO, International Search Report issued in PCT/US2020/033082, Oct. 6, 2020, 4 pages.
USPTO, International Written Opinion issued in PCT/US2020/033082, Oct. 6, 2020, 7 pages.

*Primary Examiner* — Sarah Pihonak
(74) *Attorney, Agent, or Firm* — Kutak Rock LLP

(57) ABSTRACT

A method of making a cannabidiol infused foam element is disclosed wherein the cannabidiol infused foam element comprises cannabidiol and foam, wherein the foam comprises polyurethane foam, viscoelastic foam, latex foam, or combinations thereof, wherein the cannabidiol infused foam element has a plurality of layers of foam material, and wherein the foam material also comprises the cannabidiol (e.g., in the form of an oil, a powder, or combinations thereof).

13 Claims, 1 Drawing Sheet

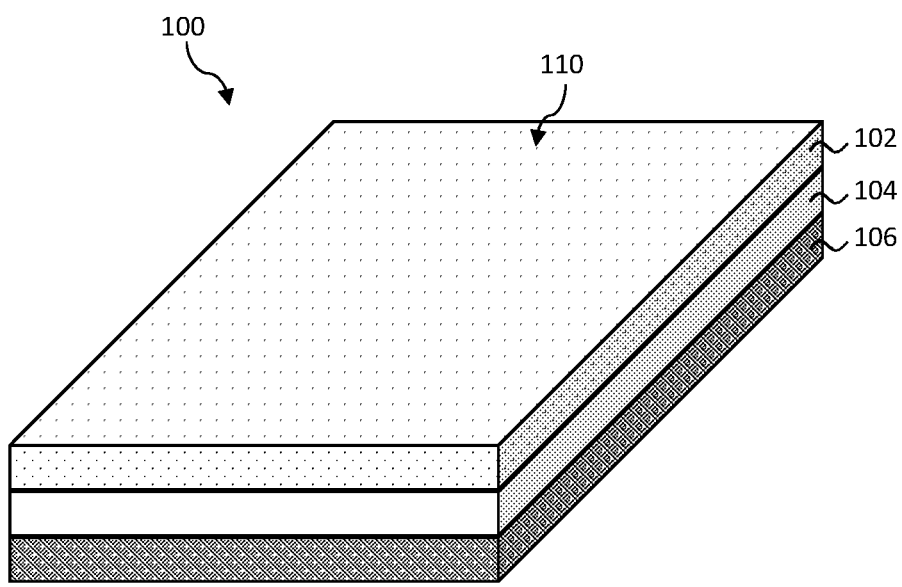

CANNABIDIOL INFUSED FOAM ELEMENT OR SURFACE

CROSS-REFERENCE TO RELATED APPLICATIONS

The present application is a U.S. nationalization 35 U.S.C. § 371 of International Application No. PCT/US2020/033082, filed May 15, 2020 which claims priority to U.S. Provisional Patent Application Ser. No. 62/849,687 filed May 17, 2019 by Anshul Gupta, et al. and entitled "Cannabidiol Infused Foam Element or Surface." The disclosures set forth in the referenced applications are incorporated herein by reference as if reproduced in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Studies and anecdotal evidence have shown that the use of cannabidiol can have beneficial effects on users. Such beneficial effects include inflammatory pain relief, neuropathic pain relief, anxiety reduction, insomnia relief, and treatment of epilepsy syndromes to name a few.

Users typically eat, smoke, and/or vape cannabidiol to benefit from cannabidiol's beneficial health effects. What is needed is a safer and more effective way for a user to intake and benefit from cannabidiol and its health improving properties.

TECHNICAL FIELD

Various embodiments relate generally to infusing foam, e.g., polyurethane foam, with cannabidiol which may be used in mattresses, pillows, seating surfaces, and sleeping surfaces, to effect the release of the cannabidiol for the benefit of the user of the infused foam via the user's inhalation and absorption of the infused cannabidiol.

SUMMARY

In some embodiments is an oil infused foam element comprising oil and foam, wherein the foam comprises polyurethane foam, viscoelastic foam, latex foam, or combinations thereof, having of a plurality of layers of foam material, wherein the foam material comprises the oil (e.g., oil encapsulated in beads).

In some embodiments is a cannabidiol infused foam element comprising cannabidiol and foam, wherein the foam comprises polyurethane foam, viscoelastic foam, latex foam, or combinations thereof, having of a plurality of layers of foam material, wherein the foam material comprises the cannabidiol (e.g., in the form of an oil, a powder, or combinations thereof).

In some embodiments is a method of making a cannabidiol infused foam element comprising cannabidiol and foam, wherein the foam comprises polyurethane foam, viscoelastic foam, latex foam, or combinations thereof, having a plurality of layers of foam material, wherein the foam material comprises the cannabidiol (e.g., in the form of an oil, a powder, or combinations thereof).

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 illustrates an infused foam element according to an embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure relate to an infused foam (e.g., comprising polyurethane foam, viscoelastic polyurethane foam, and/or latex foam) element or surface (e.g., mattress, pillow, seating surface, sleeping surface) that is infused with an oil (or other substance) derived from a marijuana, cannabis, and/or hemp plant (e.g., a cannabinoid substance). For example, the foam element may be infused with cannabidiol (CBD), and/or another infusible substance derived from any part of a cannabis and/or hemp plant. CBD forms include oil, powder, and particle. In some embodiments, the foam element may be infused with an oil containing CBD and/or another infusible substance derived from any part of a cannabis and/or hemp plant. The foam element may be configured to release the oil as a vapor (e.g., over time of the use life of the foam element) to be breathed (inhaled) by the user and/or to be absorbed into the skin of the user (e.g., the person sleeping on the foam element). It is proposed that the gradual release of the vapor over time of the use of the foam element is a safer way for a user to intake and benefit from CBD and its health improving properties as compared to ingesting, smoking, and/or vaping CBD. It is proposed that the gradual absorption of CBD over time of the use of the foam element is a safer way for a user to intake and benefit from CBD and its health improving properties as compared to ingesting, smoking, and/or vaping CBD.

FIG. 1 illustrates an exemplary embodiment of an infused foam element 100 (e.g., an oil infused foam element and/or a cannabidiol infuse foam element), wherein the oil may be present on the surface of the foam element 100 and/or within the material of the foam element 100. The foam element 100 of FIG. 1 may comprise a foam sleeping surface (e.g., a mattress), and in some embodiments, the oil infused foam element 100 may comprise one or more foam layers 102, 104, and/or 106. In some embodiments, one or more of the foam layers 102, 104, and/or 106 may be infused with CBD oil and/or another infusible substance derived from any part of a cannabis plant. While the foam element 100 is shown in FIG. 1 to have a plurality of layers 102, 104, and 106 (and may have many more), the foam element 100 may have at least one layer of foam.

In some embodiments, at least a portion of the foam element 100 (and/or one or more of the foam layers 102, 104, 106 of the foam element 100) may be infused with CBD oil by introducing, e.g., combining, the CBD oil into the ingredients of a foam material, which will comprise the foam element, during the formation of the foam element 100 (or layer 102, 104, 106). The reference to "at least a portion" encompasses embodiments wherein all of the foam element 100 comprises the CBD and/or oil disclosed herein and embodiments wherein just a portion of the foam element 100 comprises the CBD and/or oil disclosed herein. For example, in embodiments wherein the foam element 100 comprises multiple foam layers, the reference to "at least a portion" can be understood to encompass: (1) an embodiment wherein all of the foam layers comprise the CBD and/or oil disclosed herein, and (2) an embodiment wherein at least one, but not all of the foam layers, will comprise the CBD and/or oil disclosed herein. In some embodiments, the CBD oil (or other particles) may be part of the formula for creating the foam material and may therefore be an intrinsic part of the foam element 100.

In some embodiments, at least a portion of the foam element 100 (and/or one or more of the foam layers 102, 104, 106 of the foam element 100) may be infused with CBD oil by introducing, e.g., injecting, a gel containing the CBD oil into the foam material during and/or after the formation of the foam element 100 (or layer 102, 104, 106). In some embodiments, the gel may comprise a polymeric and/or polyurethane gel containing CBD as oil and/or particles within the gel.

In some embodiments, at least a portion of the foam element 100 (and/or one or more of the foam layers 102, 104, 106 of the foam element 100) may be infused with CBD oil by introducing, e.g., spraying, a fluid containing the CBD oil onto the foam material during and/or after the formation of the foam element 100 (or layer 102, 104, 106).

In some embodiments, at least a portion of the foam element 100 (and/or one or more of the foam layers 102, 104, 106 of the foam element 100) may be infused with CBD by introducing, e.g., spraying, a fluid containing the CBD into the foam material during and/or after the formation of the foam element 100 (or layer 102, 104, 106).

In some embodiments, at least a portion of the foam element 100 (and/or one or more of the foam layers 102, 104, 106 of the foam element 100) may be infused with CBD oil by encapsulating the CBD oil into beads, wherein the beads containing the CBD oil may be introduced, e.g., mixed, into the ingredients of the foam material during the formation of the foam element 100 (or layer 102, 104, 106). As shown in FIG. 1, a foam layer 102 may comprise a plurality of beads 110 incorporated into the material of the foam layer 102, wherein the beads 110 contain CBD oil. In some embodiments, the beads 110 may be designed (configured) to release the CBD oil, for example when the beads break or crack due to pressure from a user laying on or otherwise contacting a surface of the foam layer 102. In some embodiments, the beads 110 may be configured to continue break individually over the use life of the foam element 100. In some embodiments, the beads 110 containing CBD oil may not be configured to break over time and/or due to pressure (i.e., the beads 110 may retain their structure over the use life of the foam element 100). In some embodiments, the a first set of beads containing CBD oil may be configured to not break over time and/or due to pressure (i.e., the beads may retain their structure over the use life of the foam element 100) and a second set of beads may be configured to continue break individually over the use life of the foam element 100.

In some embodiments, at least a portion of the foam element 100 (and/or one or more of the foam layers 102, 104, 106 of the foam element 100) may be infused with CBD (and/or the CBD may be incorporated into the foam element 100) by introducing, e.g., mixing and/or combining, the CBD as a powder and/or particles within the foam material during and/or after the formation of the foam element 100 (or layer 102, 104, 106).

In some embodiments, at least a portion of the foam element 100 (and/or one or more of the foam layers 102, 104, 106 of the foam element 100) may be infused with CBD (and/or the CBD may be incorporated into the foam element 100) as both an oil and a powder within the foam material during and/or after the formation of the foam element 100 (or layer 102, 104, 106).

In some embodiments, at least a portion of the foam element 100 (and/or one or more of the foam layers 102, 104, 106 of the foam element 100) may be infused with CBD (and/or the CBD may be incorporated into the foam element 100) as an oil, a powder, and particles within the foam material during and/or after the formation of the foam element 100 (or layer 102, 104, 106).

In some embodiments, at least a portion of the foam element 100 (and/or one or more of the foam layers 102, 104, 106 of the foam element 100) may be infused with CBD (and/or the CBD may be incorporated into the foam element 100) as an oil encapsulated in a bead, a powder, and particles within the foam material during and/or after the formation of the foam element 100 (or layer 102, 104, 106).

In some embodiments, the foam layers 102, 104, 106 of the foam element 100 may each comprise the same form of CBD, e.g., oil, oil encapsulated bead, powder, or particle.

In some embodiments, the foam layers 102, 104, 106 of the foam element 100 may each comprise a different form of CBD, e.g., oil, oil encapsulated bead, powder, or particle.

In some embodiments, the foam layers 102, 104, 106 of the foam element 100 may each comprise multiple forms of CBD, e.g., oil, oil encapsulated bead, powder, or particle.

In some embodiments, some of the foam layers 102, 104, 106 will share the same forms of infused CBD while the other layer will have a different form of infused CBD.

In some embodiments, the foam layer 102 comprising the CBD oil (in the beads 110) may form the top surface or sleeping surface of the foam element 100, so that the user is in direct contact with the CBD oil comprising layer, i.e., a direct user contact layer. In other embodiments, the foam layer that comprises the CBD oil may form a middle layer or other layer (e.g., layer 104 and/or layer 106) within the foam element 100 such that a user does not directly contact the CBD oil with their body, and the CBD oil may be released into the air (e.g., as a vapor) and breathed by the user.

In some embodiments, only a single layer of foam in the foam element 100 may comprise CBD oil, while in other embodiments, a plurality of layers of foam in the foam element 100 may comprise CBD oil. In some embodiments, different layers of foam in the foam element 100 may be infused with CBD oil using different methods (i.e., different layers of foam may comprise different forms of CBD oil), while in other embodiments, multiple layers of foam may be infused with CBD oil in a similar method.

Having described various devices and methods herein, exemplary embodiments or aspects can include, but are not limited to the following embodiments which are numbered 1-1309:

1. An oil infused foam element comprising oil and foam.
2. The oil infused foam element of embodiment 1, wherein the foam comprises polyurethane foam.
3. The oil infused foam element of embodiment 1, wherein the foam comprises viscoelastic polyurethane foam.
4. The oil infused foam element of embodiment 1, wherein the foam comprises latex foam.
5. The oil infused foam element of embodiment 1, wherein the foam comprises polyurethane foam, viscoelastic foam, latex foam, or combinations thereof.
6. The oil infused foam element of embodiment 1, wherein the oil infused foam element comprises a plurality of layers at least one of the plurality of layers comprises the oil.
7. The oil infused foam element of embodiment 2, wherein the oil infused foam element comprises a plurality of layers at least one of the plurality of layers comprises the oil.
8. The oil infused foam element of embodiment 3, wherein the oil infused foam element comprises a plurality of layers at least one of the plurality of layers comprises the oil.
9. The oil infused foam element of embodiment 4, wherein the oil infused foam element comprises a plurality of layers at least one of the plurality of layers comprises the oil.
10. The oil infused foam element of embodiment 5, wherein the oil infused foam element comprises a plurality of layers at least one of the plurality of layers comprises the oil.
11. The oil infused foam element of embodiment 1, wherein the oil is not directly contactable by a user.
12. The oil infused foam element of embodiment 6, wherein the oil is located in a layer which will not be directly contacted by a user.
13. The oil infused foam element of embodiment 7, wherein the oil is located in a layer which will not be directly contacted by a user.
14. The oil infused foam element of embodiment 8, wherein the oil is located in a layer which will not be directly contacted by a user.
15. The oil infused foam element of embodiment 9, wherein the oil is located in a layer which will not be directly contacted by a user.
16. The oil infused foam element of embodiment 10, wherein the oil is located in a layer which will not be directly contacted by a user.
17. The oil infused foam element of embodiment 1, wherein the oil is directly contactable by a user.
18. The oil infused foam element of embodiment 6, wherein the oil is located in a layer which will be directly contacted by a user.
19. The oil infused foam element of embodiment 7, wherein the oil is located in a layer which will be directly contacted by a user.
20. The oil infused foam element of embodiment 8, wherein the oil is located in a layer which will be directly contacted by a user.
21. The oil infused foam element of embodiment 9, wherein the oil is located in a layer which will be directly contacted by a user.
22. The oil infused foam element of embodiment 10, wherein the oil is located in a layer which will be directly contacted by a user.
23. The oil infused foam element of embodiment 6, wherein more than one of the plurality of layers is infused with oil.
24. The oil infused foam element of embodiment 7, wherein more than one of the plurality of layers is infused with oil.
25. The oil infused foam element of embodiment 8, wherein more than one of the plurality of layers is infused with oil.
26. The oil infused foam element of embodiment 9, wherein more than one of the plurality of layers is infused with oil.
27. The oil infused foam element of embodiment 10, wherein more than one of the plurality of layers is infused with oil.
28. The oil infused foam element of embodiment 12, wherein more than one of the plurality of layers is infused with oil.
29. The oil infused foam element of embodiment 13, wherein more than one of the plurality of layers is infused with oil.
30. The oil infused foam element of embodiment 14, wherein more than one of the plurality of layers is infused with oil.
31. The oil infused foam element of embodiment 15, wherein more than one of the plurality of layers is infused with oil.
32. The oil infused foam element of embodiment 16, wherein more than one of the plurality of layers is infused with oil.
33. The oil infused foam element of embodiment 18, wherein more than one of the plurality of layers is infused with oil.
34. The oil infused foam element of embodiment 19, wherein more than one of the plurality of layers is infused with oil.
35. The oil infused foam element of embodiment 20, wherein more than one of the plurality of layers is infused with oil.

36. The oil infused foam element of embodiment 21, wherein more than one of the plurality of layers is infused with oil.
37. The oil infused foam element of embodiment 22, wherein more than one of the plurality of layers is infused with oil.
38. The oil infused foam element of embodiment 6, wherein each of the plurality of layers is infused with oil.
39. The oil infused foam element of embodiment 7, wherein each of the plurality of layers is infused with oil.
40. The oil infused foam element of embodiment 8, wherein each one of the plurality of layers is infused with oil.
41. The oil infused foam element of embodiment 9, wherein each of the plurality of layers is infused with oil.
42. The oil infused foam element of embodiment 10, wherein each of the plurality of layers is infused with oil.
43. The oil infused foam element of embodiment 18, wherein each of the plurality of layers is infused with oil.
44. The oil infused foam element of embodiment 19, wherein each of the plurality of layers is infused with oil.
45. The oil infused foam element of embodiment 20, wherein each of the plurality of layers is infused with oil.
46. The oil infused foam element of embodiment 21, wherein each of the plurality of layers is infused with oil.
47. The oil infused foam element of embodiment 22, wherein each of the plurality of layers is infused with oil.
48. The oil infused foam element of embodiment 1, wherein the oil is encapsulated in beads.
49. The oil infused foam element of embodiment 2, wherein the oil is encapsulated in beads.
50. The oil infused foam element of embodiment 3, wherein the oil is encapsulated in beads.
51. The oil infused foam element of embodiment 4, wherein the oil is encapsulated in beads.
52. The oil infused foam element of embodiment 5, wherein the oil is encapsulated in beads.
53. The oil infused foam element of embodiment 6, wherein the oil is encapsulated in beads.
54. The oil infused foam element of embodiment 7, wherein the oil is encapsulated in beads.
55. The oil infused foam element of embodiment 8, wherein the oil is encapsulated in beads.
56. The oil infused foam element of embodiment 9, wherein the oil is encapsulated in beads.
57. The oil infused foam element of embodiment 10, wherein the oil is encapsulated in beads.
58. The oil infused foam element of embodiment 11, wherein the oil is encapsulated in beads.
59. The oil infused foam element of embodiment 12, wherein the oil is encapsulated in beads.
60. The oil infused foam element of embodiment 13, wherein the oil is encapsulated in beads.
61. The oil infused foam element of embodiment 14, wherein the oil is encapsulated in beads.
62. The oil infused foam element of embodiment 15, wherein the oil is encapsulated in beads.
63. The oil infused foam element of embodiment 16, wherein the oil is encapsulated in beads.
64. The oil infused foam element of embodiment 17, wherein the oil is encapsulated in beads.
65. The oil infused foam element of embodiment 18, wherein the oil is encapsulated in beads.
66. The oil infused foam element of embodiment 19, wherein the oil is encapsulated in beads.
67. The oil infused foam element of embodiment 20, wherein the oil is encapsulated in beads.
68. The oil infused foam element of embodiment 21, wherein the oil is encapsulated in beads.
69. The oil infused foam element of embodiment 22, wherein the oil is encapsulated in beads.
70. The oil infused foam element of embodiment 23, wherein the oil is encapsulated in beads.
71. The oil infused foam element of embodiment 24, wherein the oil is encapsulated in beads.
72. The oil infused foam element of embodiment 25, wherein the oil is encapsulated in beads.
73. The oil infused foam element of embodiment 26, wherein the oil is encapsulated in beads.
74. The oil infused foam element of embodiment 27, wherein the oil is encapsulated in beads.
75. The oil infused foam element of embodiment 28, wherein the oil is encapsulated in beads.
76. The oil infused foam element of embodiment 29, wherein the oil is encapsulated in beads.
77. The oil infused foam element of embodiment 30, wherein the oil is encapsulated in beads.
78. The oil infused foam element of embodiment 31, wherein the oil is encapsulated in beads.
79. The oil infused foam element of embodiment 32, wherein the oil is encapsulated in beads.
80. The oil infused foam element of embodiment 33, wherein the oil is encapsulated in beads.
81. The oil infused foam element of embodiment 34, wherein the oil is encapsulated in beads.
82. The oil infused foam element of embodiment 35, wherein the oil is encapsulated in beads.
83. The oil infused foam element of embodiment 36, wherein the oil is encapsulated in beads.
84. The oil infused foam element of embodiment 37, wherein the oil is encapsulated in beads.
85. The oil infused foam element of embodiment 38, wherein the oil is encapsulated in beads.
86. The oil infused foam element of embodiment 39, wherein the oil is encapsulated in beads.
87. The oil infused foam element of embodiment 40, wherein the oil is encapsulated in beads.
88. The oil infused foam element of embodiment 41, wherein the oil is encapsulated in beads.
89. The oil infused foam element of embodiment 42, wherein the oil is encapsulated in beads.
90. The oil infused foam element of embodiment 43, wherein the oil is encapsulated in beads.
91. The oil infused foam element of embodiment 44, wherein the oil is encapsulated in beads.
92. The oil infused foam element of embodiment 45, wherein the oil is encapsulated in beads.
93. The oil infused foam element of embodiment 45, wherein the oil is encapsulated in beads.
94. The oil infused foam element of embodiment 47, wherein the oil is encapsulated in beads.
95. The oil infused foam element of embodiment 48, wherein the beads are dispersed throughout the foam.

96. The oil infused foam element of embodiment 49, wherein the beads are dispersed throughout the foam.
97. The oil infused foam element of embodiment 50, wherein the beads are dispersed throughout the foam.
98. The oil infused foam element of embodiment 51, wherein the beads are dispersed throughout the foam.
99. The oil infused foam element of embodiment 52, wherein the beads are dispersed throughout the foam.
100. The oil infused foam element of embodiment 53, wherein the beads are dispersed throughout the foam.
101. The oil infused foam element of embodiment 54, wherein the beads are dispersed throughout the foam.
102. The oil infused foam element of embodiment 55, wherein the beads are dispersed throughout the foam.
103. The oil infused foam element of embodiment 56, wherein the beads are dispersed throughout the foam.
104. The oil infused foam element of embodiment 57, wherein the beads are dispersed throughout the foam.
105. The oil infused foam element of embodiment 58, wherein the beads are dispersed throughout the foam.
106. The oil infused foam element of embodiment 59, wherein the beads are dispersed throughout the foam.
107. The oil infused foam element of embodiment 60, wherein the beads are dispersed throughout the foam.
108. The oil infused foam element of embodiment 61, wherein the beads are dispersed throughout the foam.
109. The oil infused foam element of embodiment 62, wherein the beads are dispersed throughout the foam.
110. The oil infused foam element of embodiment 63, wherein the beads are dispersed throughout the foam.
111. The oil infused foam element of embodiment 64, wherein the beads are dispersed throughout the foam.
112. The oil infused foam element of embodiment 65, wherein the beads are dispersed throughout the foam.
113. The oil infused foam element of embodiment 66, wherein the beads are dispersed throughout the foam.
114. The oil infused foam element of embodiment 67, wherein the beads are dispersed throughout the foam.
115. The oil infused foam element of embodiment 68, wherein the beads are dispersed throughout the foam.
116. The oil infused foam element of embodiment 69, wherein the beads are dispersed throughout the foam.
117. The oil infused foam element of embodiment 70, wherein the beads are dispersed throughout the foam.
118. The oil infused foam element of embodiment 71, wherein the beads are dispersed throughout the foam.
119. The oil infused foam element of embodiment 72, wherein the beads are dispersed throughout the foam.
120. The oil infused foam element of embodiment 73, wherein the beads are dispersed throughout the foam.
121. The oil infused foam element of embodiment 74, wherein the beads are dispersed throughout the foam.
122. The oil infused foam element of embodiment 75, wherein the beads are dispersed throughout the foam.
123. The oil infused foam element of embodiment 76, wherein the beads are dispersed throughout the foam.
124. The oil infused foam element of embodiment 77, wherein the beads are dispersed throughout the foam.
125. The oil infused foam element of embodiment 78, wherein the beads are dispersed throughout the foam.
126. The oil infused foam element of embodiment 79, wherein the beads are dispersed throughout the foam.
127. The oil infused foam element of embodiment 80, wherein the beads are dispersed throughout the foam.
128. The oil infused foam element of embodiment 81, wherein the beads are dispersed throughout the foam.
129. The oil infused foam element of embodiment 82, wherein the beads are dispersed throughout the foam.
130. The oil infused foam element of embodiment 83, wherein the beads are dispersed throughout the foam.
131. The oil infused foam element of embodiment 84, wherein the beads are dispersed throughout the foam.
132. The oil infused foam element of embodiment 84, wherein the beads are dispersed throughout the foam.
133. The oil infused foam element of embodiment 84, wherein the beads are dispersed throughout the foam.
134. The oil infused foam element of embodiment 87, wherein the beads are dispersed throughout the foam.
135. The oil infused foam element of embodiment 88, wherein the beads are dispersed throughout the foam.
136. The oil infused foam element of embodiment 89, wherein the beads are dispersed throughout the foam.
137. The oil infused foam element of embodiment 90, wherein the beads are dispersed throughout the foam.
138. The oil infused foam element of embodiment 91, wherein the beads are dispersed throughout the foam.
139. The oil infused foam element of embodiment 92, wherein the beads are dispersed throughout the foam.
140. The oil infused foam element of embodiment 93, wherein the beads are dispersed throughout the foam.
141. The oil infused foam element of embodiment 94, wherein the beads are dispersed throughout the foam.
142. The oil infused foam element of embodiment 48, wherein the beads are configured to break individually over a use life of the foam element.
143. The oil infused foam element of embodiment 49, wherein the beads are configured to break individually over a use life of the foam element.
144. The oil infused foam element of embodiment 50, wherein the beads are configured to break individually over a use life of the foam element.
145. The oil infused foam element of embodiment 51, wherein the beads are configured to break individually over a use life of the foam element.
146. The oil infused foam element of embodiment 52, wherein the beads are configured to break individually over a use life of the foam element.
147. The oil infused foam element of embodiment 53, wherein the beads are configured to break individually over a use life of the foam element.
148. The oil infused foam element of embodiment 54, wherein the beads are configured to break individually over a use life of the foam element.
149. The oil infused foam element of embodiment 55, wherein the beads are configured to break individually over a use life of the foam element.
150. The oil infused foam element of embodiment 56, wherein the beads are configured to break individually over a use life of the foam element.
151. The oil infused foam element of embodiment 57, wherein the beads are configured to break individually over a use life of the foam element.
152. The oil infused foam element of embodiment 58, wherein the beads are configured to break individually over a use life of the foam element.
153. The oil infused foam element of embodiment 59, wherein the beads are configured to break individually over a use life of the foam element.
154. The oil infused foam element of embodiment 60, wherein the beads are configured to break individually over a use life of the foam element.

155. The oil infused foam element of embodiment 61, wherein the beads are configured to break individually over a use life of the foam element.
156. The oil infused foam element of embodiment 62, wherein the beads are configured to break individually over a use life of the foam element.
157. The oil infused foam element of embodiment 63, wherein the beads are configured to break individually over a use life of the foam element.
158. The oil infused foam element of embodiment 64, wherein the beads are configured to break individually over a use life of the foam element.
159. The oil infused foam element of embodiment 65, wherein the beads are configured to break individually over a use life of the foam element.
160. The oil infused foam element of embodiment 66, wherein the beads are configured to break individually over a use life of the foam element.
161. The oil infused foam element of embodiment 67, wherein the beads are configured to break individually over a use life of the foam element.
162. The oil infused foam element of embodiment 68, wherein the beads are configured to break individually over a use life of the foam element.
163. The oil infused foam element of embodiment 69, wherein the beads are configured to break individually over a use life of the foam element
164. The oil infused foam element of embodiment 70, wherein the beads are configured to break individually over a use life of the foam element.
165. The oil infused foam element of embodiment 71, wherein the beads are configured to break individually over a use life of the foam element.
166. The oil infused foam element of embodiment 72, wherein the beads are configured to break individually over a use life of the foam element.
167. The oil infused foam element of embodiment 73, wherein the beads are configured to break individually over a use life of the foam element.
168. The oil infused foam element of embodiment 74, wherein the beads are configured to break individually over a use life of the foam element.
169. The oil infused foam element of embodiment 75, wherein the beads are configured to break individually over a use life of the foam element.
170. The oil infused foam element of embodiment 76, wherein the beads are configured to break individually over a use life of the foam element.
171. The oil infused foam element of embodiment 77, wherein the beads are configured to break individually over a use life of the foam element.
172. The oil infused foam element of embodiment 78, wherein the beads are configured to break individually over a use life of the foam element.
173. The oil infused foam element of embodiment 79, wherein the beads are configured to break individually over a use life of the foam element.
174. The oil infused foam element of embodiment 80, wherein the beads are configured to break individually over a use life of the foam element.
175. The oil infused foam element of embodiment 81, wherein the beads are configured to break individually over a use life of the foam element.
176. The oil infused foam element of embodiment 82, wherein the beads are configured to break individually over a use life of the foam element.
177. The oil infused foam element of embodiment 83, wherein the beads are configured to break individually over a use life of the foam element.
178. The oil infused foam element of embodiment 84, wherein the beads are configured to break individually over a use life of the foam element.
179. The oil infused foam element of embodiment 85, wherein the beads are configured to break individually over a use life of the foam element.
180. The oil infused foam element of embodiment 86, wherein the beads are configured to break individually over a use life of the foam element.
181. The oil infused foam element of embodiment 87, wherein the beads are configured to break individually over a use life of the foam element.
182. The oil infused foam element of embodiment 88, wherein the beads are configured to break individually over a use life of the foam element.
183. The oil infused foam element of embodiment 89, wherein the beads are configured to break individually over a use life of the foam element.
184. The oil infused foam element of embodiment 90, wherein the beads are configured to break individually over a use life of the foam element.
185. The oil infused foam element of embodiment 91, wherein the beads are configured to break individually over a use life of the foam element
186. The oil infused foam element of embodiment 92, wherein the beads are configured to break individually over a use life of the foam element.
187. The oil infused foam element of embodiment 93, wherein the beads are configured to break individually over a use life of the foam element.
188. The oil infused foam element of embodiment 94, wherein the beads are configured to break individually over a use life of the foam element.
189. The oil infused foam element of embodiment 95, wherein the beads are configured to break individually over a use life of the foam element.
190. The oil infused foam element of embodiment 96, wherein the beads are configured to break individually over a use life of the foam element.
191. The oil infused foam element of embodiment 97, wherein the beads are configured to break individually over a use life of the foam element.
192. The oil infused foam element of embodiment 98, wherein the beads are configured to break individually over a use life of the foam element.
193. The oil infused foam element of embodiment 99, wherein the beads are configured to break individually over a use life of the foam element.
194. The oil infused foam element of embodiment 100, wherein the beads are configured to break individually over a use life of the foam element.
195. The oil infused foam element of embodiment 101, wherein the beads are configured to break individually over a use life of the foam element.
196. The oil infused foam element of embodiment 102, wherein the beads are configured to break individually over a use life of the foam element.
197. The oil infused foam element of embodiment 103, wherein the beads are configured to break individually over a use life of the foam element.
198. The oil infused foam element of embodiment 104, wherein the beads are configured to break individually over a use life of the foam element.

199. The oil infused foam element of embodiment 105, wherein the beads are configured to break individually over a use life of the foam element.
200. The oil infused foam element of embodiment 106, wherein the beads are configured to break individually over a use life of the foam element.
201. The oil infused foam element of embodiment 107, wherein the beads are configured to break individually over a use life of the foam element.
202. The oil infused foam element of embodiment 108, wherein the beads are configured to break individually over a use life of the foam element.
203. The oil infused foam element of embodiment 109, wherein the beads are configured to break individually over a use life of the foam element.
204. The oil infused foam element of embodiment 110, wherein the beads are configured to break individually over a use life of the foam element.
205. The oil infused foam element of embodiment 111, wherein the beads are configured to break individually over a use life of the foam element.
206. The oil infused foam element of embodiment 112, wherein the beads are configured to break individually over a use life of the foam element.
207. The oil infused foam element of embodiment 113, wherein the beads are configured to break individually over a use life of the foam element
208. The oil infused foam element of embodiment 114, wherein the beads are configured to break individually over a use life of the foam element.
209. The oil infused foam element of embodiment 115, wherein the beads are configured to break individually over a use life of the foam element.
210. The oil infused foam element of embodiment 116, wherein the beads are configured to break individually over a use life of the foam element.
211. The oil infused foam element of embodiment 117, wherein the beads are configured to break individually over a use life of the foam element.
212. The oil infused foam element of embodiment 118, wherein the beads are configured to break individually over a use life of the foam element.
213. The oil infused foam element of embodiment 119, wherein the beads are configured to break individually over a use life of the foam element.
214. The oil infused foam element of embodiment 120, wherein the beads are configured to break individually over a use life of the foam element.
215. The oil infused foam element of embodiment 121, wherein the beads are configured to break individually over a use life of the foam element.
216. The oil infused foam element of embodiment 122, wherein the beads are configured to break individually over a use life of the foam element.
217. The oil infused foam element of embodiment 123, wherein the beads are configured to break individually over a use life of the foam element.
218. The oil infused foam element of embodiment 124, wherein the beads are configured to break individually over a use life of the foam element.
219. The oil infused foam element of embodiment 125, wherein the beads are configured to break individually over a use life of the foam element.
220. The oil infused foam element of embodiment 126, wherein the beads are configured to break individually over a use life of the foam element.
221. The oil infused foam element of embodiment 127, wherein the beads are configured to break individually over a use life of the foam element.
222. The oil infused foam element of embodiment 128, wherein the beads are configured to break individually over a use life of the foam element.
223. The oil infused foam element of embodiment 129, wherein the beads are configured to break individually over a use life of the foam element.
224. The oil infused foam element of embodiment 130 wherein the beads are configured to break individually over a use life of the foam element.
225. The oil infused foam element of embodiment 131, wherein the beads are configured to break individually over a use life of the foam element.
226. The oil infused foam element of embodiment 132, wherein the beads are configured to break individually over a use life of the foam element.
227. The oil infused foam element of embodiment 133, wherein the beads are configured to break individually over a use life of the foam element.
228. The oil infused foam element of embodiment 134, wherein the beads are configured to break individually over a use life of the foam element.
229. The oil infused foam element of embodiment 135, wherein the beads are configured to break individually over a use life of the foam element
230. The oil infused foam element of embodiment 136, wherein the beads are configured to break individually over a use life of the foam element.
231. The oil infused foam element of embodiment 137, wherein the beads are configured to break individually over a use life of the foam element.
232. The oil infused foam element of embodiment 138, wherein the beads are configured to break individually over a use life of the foam element.
233. The oil infused foam element of embodiment 139, wherein the beads are configured to break individually over a use life of the foam element.
234. The oil infused foam element of embodiment 140, wherein the beads are configured to break individually over a use life of the foam element.
235. The oil infused foam element of embodiment 141, wherein the beads are configured to break individually over a use life of the foam element.
236. The oil infused foam element of embodiment 48, wherein the beads are configured to not break individually over a use life of the foam element.
237. The oil infused foam element of embodiment 49, wherein the beads are configured to not break individually over a use life of the foam element.
238. The oil infused foam element of embodiment 50, wherein the beads are configured to not break individually over a use life of the foam element.
239. The oil infused foam element of embodiment 51, wherein the beads are configured to not break individually over a use life of the foam element.
240. The oil infused foam element of embodiment 52, wherein the beads are configured to not break individually over a use life of the foam element.
241. The oil infused foam element of embodiment 53, wherein the beads are configured to not break individually over a use life of the foam element.
242. The oil infused foam element of embodiment 54, wherein the beads are configured to not break individually over a use life of the foam element.

243. The oil infused foam element of embodiment 55, wherein the beads are configured to not break individually over a use life of the foam element.

244. The oil infused foam element of embodiment 56, wherein the beads are configured to not break individually over a use life of the foam element.

245. The oil infused foam element of embodiment 57, wherein the beads are configured to not break individually over a use life of the foam element.

246. The oil infused foam element of embodiment 58, wherein the beads are configured to not break individually over a use life of the foam element.

247. The oil infused foam element of embodiment 59, wherein the beads are configured to not break individually over a use life of the foam element.

248. The oil infused foam element of embodiment 60, wherein the beads are configured to not break individually over a use life of the foam element.

249. The oil infused foam element of embodiment 61, wherein the beads are configured to not break individually over a use life of the foam element.

250. The oil infused foam element of embodiment 62, wherein the beads are configured to not break individually over a use life of the foam element.

251. The oil infused foam element of embodiment 63, wherein the beads are configured to not break individually over a use life of the foam element.

252. The oil infused foam element of embodiment 64, wherein the beads are configured to not break individually over a use life of the foam element.

253. The oil infused foam element of embodiment 65, wherein the beads are configured to not break individually over a use life of the foam element.

254. The oil infused foam element of embodiment 66, wherein the beads are configured to not break individually over a use life of the foam element.

255. The oil infused foam element of embodiment 67, wherein the beads are configured to not break individually over a use life of the foam element.

256. The oil infused foam element of embodiment 68, wherein the beads are configured to not break individually over a use life of the foam element.

257. The oil infused foam element of embodiment 69, wherein the beads are configured to not break individually over a use life of the foam element 258. The oil infused foam element of embodiment 70, wherein the beads are configured to not break individually over a use life of the foam element.

259. The oil infused foam element of embodiment 71, wherein the beads are configured to not break individually over a use life of the foam element.

260. The oil infused foam element of embodiment 72, wherein the beads are configured to not break individually over a use life of the foam element.

261. The oil infused foam element of embodiment 73, wherein the beads are configured to not break individually over a use life of the foam element.

262. The oil infused foam element of embodiment 74, wherein the beads are configured to not break individually over a use life of the foam element.

263. The oil infused foam element of embodiment 75, wherein the beads are configured to not break individually over a use life of the foam element.

264. The oil infused foam element of embodiment 76, wherein the beads are configured to not break individually over a use life of the foam element.

265. The oil infused foam element of embodiment 77, wherein the beads are configured to not break individually over a use life of the foam element.

266. The oil infused foam element of embodiment 78, wherein the beads are configured to not break individually over a use life of the foam element.

267. The oil infused foam element of embodiment 79, wherein the beads are configured to not break individually over a use life of the foam element.

268. The oil infused foam element of embodiment 80, wherein the beads are configured to not break individually over a use life of the foam element.

269. The oil infused foam element of embodiment 81, wherein the beads are configured to not break individually over a use life of the foam element.

270. The oil infused foam element of embodiment 82, wherein the beads are configured to not break individually over a use life of the foam element.

271. The oil infused foam element of embodiment 83, wherein the beads are configured to not break individually over a use life of the foam element.

272. The oil infused foam element of embodiment 84, wherein the beads are configured to not break individually over a use life of the foam element.

273. The oil infused foam element of embodiment 85, wherein the beads are configured to not break individually over a use life of the foam element.

274. The oil infused foam element of embodiment 86, wherein the beads are configured to not break individually over a use life of the foam element.

275. The oil infused foam element of embodiment 87, wherein the beads are configured to not break individually over a use life of the foam element.

276. The oil infused foam element of embodiment 88, wherein the beads are configured to not break individually over a use life of the foam element.

277. The oil infused foam element of embodiment 89, wherein the beads are configured to not break individually over a use life of the foam element.

278. The oil infused foam element of embodiment 90, wherein the beads are configured to not break individually over a use life of the foam element.

279. The oil infused foam element of embodiment 91, wherein the beads are configured to not break individually over a use life of the foam element 280. The oil infused foam element of embodiment 92, wherein the beads are configured to not break individually over a use life of the foam element.

281. The oil infused foam element of embodiment 93, wherein the beads are configured to not break individually over a use life of the foam element.

282. The oil infused foam element of embodiment 94, wherein the beads are configured to not break individually over a use life of the foam element.

283. The oil infused foam element of embodiment 95, wherein the beads are configured to not break individually over a use life of the foam element.

284. The oil infused foam element of embodiment 96, wherein the beads are configured to not break individually over a use life of the foam element.

285. The oil infused foam element of embodiment 97, wherein the beads are configured to not break individually over a use life of the foam element.

286. The oil infused foam element of embodiment 98, wherein the beads are configured to not break individually over a use life of the foam element.

287. The oil infused foam element of embodiment 99, wherein the beads are configured to not break individually over a use life of the foam element.
288. The oil infused foam element of embodiment 100, wherein the beads are configured to not break individually over a use life of the foam element.
289. The oil infused foam element of embodiment 101, wherein the beads are configured to not break individually over a use life of the foam element.
290. The oil infused foam element of embodiment 102, wherein the beads are configured to not break individually over a use life of the foam element.
291. The oil infused foam element of embodiment 103, wherein the beads are configured to not break individually over a use life of the foam element.
292. The oil infused foam element of embodiment 104, wherein the beads are configured to not break individually over a use life of the foam element.
293. The oil infused foam element of embodiment 105, wherein the beads are configured to not break individually over a use life of the foam element.
294. The oil infused foam element of embodiment 106, wherein the beads are configured to not break individually over a use life of the foam element.
295. The oil infused foam element of embodiment 107, wherein the beads are configured to not break individually over a use life of the foam element.
296. The oil infused foam element of embodiment 108, wherein the beads are configured to not break individually over a use life of the foam element.
297. The oil infused foam element of embodiment 109, wherein the beads are configured to not break individually over a use life of the foam element.
298. The oil infused foam element of embodiment 110, wherein the beads are configured to not break individually over a use life of the foam element.
299. The oil infused foam element of embodiment 111, wherein the beads are configured to not break individually over a use life of the foam element.
300. The oil infused foam element of embodiment 112, wherein the beads are configured to not break individually over a use life of the foam element.
301. The oil infused foam element of embodiment 113, wherein the beads are configured to not break individually over a use life of the foam element
302. The oil infused foam element of embodiment 114, wherein the beads are configured to not break individually over a use life of the foam element.
303. The oil infused foam element of embodiment 115, wherein the beads are configured to not break individually over a use life of the foam element.
304. The oil infused foam element of embodiment 116, wherein the beads are configured to not break individually over a use life of the foam element.
305. The oil infused foam element of embodiment 117, wherein the beads are configured to not break individually over a use life of the foam element.
306. The oil infused foam element of embodiment 118, wherein the beads are configured to not break individually over a use life of the foam element.
307. The oil infused foam element of embodiment 119, wherein the beads are configured to not break individually over a use life of the foam element.
308. The oil infused foam element of embodiment 120, wherein the beads are configured to not break individually over a use life of the foam element.
309. The oil infused foam element of embodiment 121, wherein the beads are configured to not break individually over a use life of the foam element.
310. The oil infused foam element of embodiment 122, wherein the beads are configured to not break individually over a use life of the foam element.
311. The oil infused foam element of embodiment 123, wherein the beads are configured to not break individually over a use life of the foam element.
312. The oil infused foam element of embodiment 124, wherein the beads are configured to not break individually over a use life of the foam element.
313. The oil infused foam element of embodiment 125, wherein the beads are configured to not break individually over a use life of the foam element.
314. The oil infused foam element of embodiment 126, wherein the beads are configured to not break individually over a use life of the foam element.
315. The oil infused foam element of embodiment 127, wherein the beads are configured to not break individually over a use life of the foam element.
316. The oil infused foam element of embodiment 128, wherein the beads are configured to not break individually over a use life of the foam element.
317. The oil infused foam element of embodiment 129, wherein the beads are configured to not break individually over a use life of the foam element.
318. The oil infused foam element of embodiment 130 wherein the beads are configured to not break individually over a use life of the foam element.
319. The oil infused foam element of embodiment 131, wherein the beads are configured to not break individually over a use life of the foam element.
320. The oil infused foam element of embodiment 132, wherein the beads are configured to not break individually over a use life of the foam element.
321. The oil infused foam element of embodiment 133, wherein the beads are configured to not break individually over a use life of the foam element.
322. The oil infused foam element of embodiment 134, wherein the beads are configured to not break individually over a use life of the foam element.
323. The oil infused foam element of embodiment 135, wherein the beads are configured to not break individually over a use life of the foam element
324. The oil infused foam element of embodiment 136, wherein the beads are configured to not break individually over a use life of the foam element.
325. The oil infused foam element of embodiment 137, wherein the beads are configured to not break individually over a use life of the foam element.
326. The oil infused foam element of embodiment 138, wherein the beads are configured to not break individually over a use life of the foam element.
327. The oil infused foam element of embodiment 139, wherein the beads are configured to not break individually over a use life of the foam element.
328. The oil infused foam element of embodiment 140, wherein the beads are configured to not break individually over a use life of the foam element.
329. The oil infused foam element of embodiment 141, wherein the beads are configured to not break individually over a use life of the foam element.
330. The oil infused foam element of embodiment 48, wherein a first set of beads is configured to break individually over a use life of the foam element and a second set of beads is configured to not break individually over the use life of the foam element.

331. The oil infused foam element of embodiment 49, wherein a first set of beads is configured to break individually over a use life of the foam element and a second set of beads is configured to not break individually over the use life of the foam element.

332. The oil infused foam element of embodiment 50, wherein a first set of beads is configured to break individually over a use life of the foam element and a second set of beads is configured to not break individually over the use life of the foam element.

333. The oil infused foam element of embodiment 51, wherein a first set of beads is configured to break individually over a use life of the foam element and a second set of beads is configured to not break individually over the use life of the foam element.

334. The oil infused foam element of embodiment 52, wherein a first set of beads is configured to break individually over a use life of the foam element and a second set of beads is configured to not break individually over the use life of the foam element.

335. The oil infused foam element of embodiment 53, wherein a first set of beads is configured to break individually over a use life of the foam element and a second set of beads is configured to not break individually over the use life of the foam element.

336. The oil infused foam element of embodiment 54, wherein a first set of beads is configured to break individually over a use life of the foam element and a second set of beads is configured to not break individually over the use life of the foam element.

337. The oil infused foam element of embodiment 55, wherein a first set of beads is configured to break individually over a use life of the foam element and a second set of beads is configured to not break individually over the use life of the foam element.

338. The oil infused foam element of embodiment 56, wherein a first set of beads is configured to break individually over a use life of the foam element and a second set of beads is configured to not break individually over the use life of the foam element.

339. The oil infused foam element of embodiment 57, wherein a first set of beads is configured to break individually over a use life of the foam element and a second set of beads is configured to not break individually over the use life of the foam element.

340. The oil infused foam element of embodiment 58, wherein a first set of beads is configured to break individually over a use life of the foam element and a second set of beads is configured to not break individually over the use life of the foam element.

341. The oil infused foam element of embodiment 59, wherein a first set of beads is configured to break individually over a use life of the foam element and a second set of beads is configured to not break individually over the use life of the foam element.

342. The oil infused foam element of embodiment 60, wherein a first set of beads is configured to break individually over a use life of the foam element and a second set of beads is configured to not break individually over the use life of the foam element.

343. The oil infused foam element of embodiment 61, wherein a first set of beads is configured to break individually over a use life of the foam element and a second set of beads is configured to not break individually over the use life of the foam element.

344. The oil infused foam element of embodiment 62, wherein a first set of beads is configured to break individually over a use life of the foam element and a second set of beads is configured to not break individually over the use life of the foam element.

345. The oil infused foam element of embodiment 63, wherein a first set of beads is configured to break individually over a use life of the foam element and a second set of beads is configured to not break individually over the use life of the foam element.

346. The oil infused foam element of embodiment 64, wherein a first set of beads is configured to break individually over a use life of the foam element and a second set of beads is configured to not break individually over the use life of the foam element.

347. The oil infused foam element of embodiment 65, wherein a first set of beads is configured to break individually over a use life of the foam element and a second set of beads is configured to not break individually over the use life of the foam element.

348. The oil infused foam element of embodiment 66, wherein a first set of beads is configured to break individually over a use life of the foam element and a second set of beads is configured to not break individually over the use life of the foam element.

349. The oil infused foam element of embodiment 67, wherein a first set of beads is configured to break individually over a use life of the foam element and a second set of beads is configured to not break individually over the use life of the foam element.

350. The oil infused foam element of embodiment 68, wherein a first set of beads is configured to break individually over a use life of the foam element and a second set of beads is configured to not break individually over the use life of the foam element.

351. The oil infused foam element of embodiment 69, wherein a first set of beads is configured to break individually over a use life of the foam element and a second set of beads is configured to not break individually over the use life of the foam element 352. The oil infused foam element of embodiment 70, wherein a first set of beads is configured to break individually over a use life of the foam element and a second set of beads is configured to not break individually over the use life of the foam element.

353. The oil infused foam element of embodiment 71, wherein a first set of beads is configured to break individually over a use life of the foam element and a second set of beads is configured to not break individually over the use life of the foam element.

354. The oil infused foam element of embodiment 72, wherein a first set of beads is configured to break individually over a use life of the foam element and a second set of beads is configured to not break individually over the use life of the foam element.

355. The oil infused foam element of embodiment 73, wherein a first set of beads is configured to break individually over a use life of the foam element and a second set of beads is configured to not break individually over the use life of the foam element.

356. The oil infused foam element of embodiment 74, wherein a first set of beads is configured to break individually over a use life of the foam element and a second set of beads is configured to not break individually over the use life of the foam element.

357. The oil infused foam element of embodiment 75, wherein a first set of beads is configured to break individually over a use life of the foam element and a second set of beads is configured to not break individually over the use life of the foam element.

358. The oil infused foam element of embodiment 76, wherein a first set of beads is configured to break individually over a use life of the foam element and a second set of beads is configured to not break individually over the use life of the foam element.

359. The oil infused foam element of embodiment 77, wherein a first set of beads is configured to break individually over a use life of the foam element and a second set of beads is configured to not break individually over the use life of the foam element.

360. The oil infused foam element of embodiment 78, wherein a first set of beads is configured to break individually over a use life of the foam element and a second set of beads is configured to not break individually over the use life of the foam element.

361. The oil infused foam element of embodiment 79, wherein a first set of beads is configured to break individually over a use life of the foam element and a second set of beads is configured to not break individually over the use life of the foam element.

362. The oil infused foam element of embodiment 80, wherein a first set of beads is configured to break individually over a use life of the foam element and a second set of beads is configured to not break individually over the use life of the foam element.

363. The oil infused foam element of embodiment 81, wherein a first set of beads is configured to break individually over a use life of the foam element and a second set of beads is configured to not break individually over the use life of the foam element.

364. The oil infused foam element of embodiment 82, wherein a first set of beads is configured to break individually over a use life of the foam element and a second set of beads is configured to not break individually over the use life of the foam element.

365. The oil infused foam element of embodiment 83, wherein a first set of beads is configured to break individually over a use life of the foam element and a second set of beads is configured to not break individually over the use life of the foam element.

366. The oil infused foam element of embodiment 84, wherein a first set of beads is configured to break individually over a use life of the foam element and a second set of beads is configured to not break individually over the use life of the foam element.

367. The oil infused foam element of embodiment 85, wherein a first set of beads is configured to break individually over a use life of the foam element and a second set of beads is configured to not break individually over the use life of the foam element.

368. The oil infused foam element of embodiment 86, wherein a first set of beads is configured to break individually over a use life of the foam element and a second set of beads is configured to not break individually over the use life of the foam element.

369. The oil infused foam element of embodiment 87, wherein a first set of beads is configured to break individually over a use life of the foam element and a second set of beads is configured to not break individually over the use life of the foam element.

370. The oil infused foam element of embodiment 88, wherein a first set of beads is configured to break individually over a use life of the foam element and a second set of beads is configured to not break individually over the use life of the foam element.

371. The oil infused foam element of embodiment 89, wherein a first set of beads is configured to break individually over a use life of the foam element and a second set of beads is configured to not break individually over the use life of the foam element.

372. The oil infused foam element of embodiment 90, wherein a first set of beads is configured to break individually over a use life of the foam element and a second set of beads is configured to not break individually over the use life of the foam element.

373. The oil infused foam element of embodiment 91, wherein a first set of beads is configured to break individually over a use life of the foam element and a second set of beads is configured to not break individually over the use life of the foam element 374. The oil infused foam element of embodiment 92, wherein a first set of beads is configured to break individually over a use life of the foam element and a second set of beads is configured to not break individually over the use life of the foam element.

375. The oil infused foam element of embodiment 93, wherein a first set of beads is configured to break individually over a use life of the foam element and a second set of beads is configured to not break individually over the use life of the foam element.

376. The oil infused foam element of embodiment 94, wherein a first set of beads is configured to break individually over a use life of the foam element and a second set of beads is configured to not break individually over the use life of the foam element.

377. The oil infused foam element of embodiment 95, wherein a first set of beads is configured to break individually over a use life of the foam element and a second set of beads is configured to not break individually over the use life of the foam element.

378. The oil infused foam element of embodiment 96, wherein a first set of beads is configured to break individually over a use life of the foam element and a second set of beads is configured to not break individually over the use life of the foam element.

379. The oil infused foam element of embodiment 97, wherein a first set of beads is configured to break individually over a use life of the foam element and a second set of beads is configured to not break individually over the use life of the foam element.

380. The oil infused foam element of embodiment 98, wherein a first set of beads is configured to break individually over a use life of the foam element and a second set of beads is configured to not break individually over the use life of the foam element.

381. The oil infused foam element of embodiment 99, wherein a first set of beads is configured to break individually over a use life of the foam element and a second set of beads is configured to not break individually over the use life of the foam element.

382. The oil infused foam element of embodiment 100, wherein a first set of beads is configured to break individually over a use life of the foam element and a second set of beads is configured to not break individually over the use life of the foam element.

383. The oil infused foam element of embodiment 101, wherein a first set of beads is configured to break individually over a use life of the foam element and a second set of beads is configured to not break individually over the use life of the foam element.

384. The oil infused foam element of embodiment 102, wherein a first set of beads is configured to break individually over a use life of the foam element and a second set of beads is configured to not break individually over the use life of the foam element.
385. The oil infused foam element of embodiment 103, wherein a first set of beads is configured to break individually over a use life of the foam element and a second set of beads is configured to not break individually over the use life of the foam element.
386. The oil infused foam element of embodiment 104, wherein a first set of beads is configured to break individually over a use life of the foam element and a second set of beads is configured to not break individually over the use life of the foam element.
387. The oil infused foam element of embodiment 105, wherein a first set of beads is configured to break individually over a use life of the foam element and a second set of beads is configured to not break individually over the use life of the foam element.
388. The oil infused foam element of embodiment 106, wherein a first set of beads is configured to break individually over a use life of the foam element and a second set of beads is configured to not break individually over the use life of the foam element.
389. The oil infused foam element of embodiment 107, wherein a first set of beads is configured to break individually over a use life of the foam element and a second set of beads is configured to not break individually over the use life of the foam element.
390. The oil infused foam element of embodiment 108, wherein a first set of beads is configured to break individually over a use life of the foam element and a second set of beads is configured to not break individually over the use life of the foam element.
391. The oil infused foam element of embodiment 109, wherein a first set of beads is configured to break individually over a use life of the foam element and a second set of beads is configured to not break individually over the use life of the foam element.
392. The oil infused foam element of embodiment 110, wherein a first set of beads is configured to break individually over a use life of the foam element and a second set of beads is configured to not break individually over the use life of the foam element.
393. The oil infused foam element of embodiment 111, wherein a first set of beads is configured to break individually over a use life of the foam element and a second set of beads is configured to not break individually over the use life of the foam element.
394. The oil infused foam element of embodiment 112, wherein a first set of beads is configured to break individually over a use life of the foam element and a second set of beads is configured to not break individually over the use life of the foam element.
395. The oil infused foam element of embodiment 113, wherein a first set of beads is configured to break individually over a use life of the foam element and a second set of beads is configured to not break individually over the use life of the foam element
396. The oil infused foam element of embodiment 114, wherein a first set of beads is configured to break individually over a use life of the foam element and a second set of beads is configured to not break individually over the use life of the foam element.
397. The oil infused foam element of embodiment 115, wherein a first set of beads is configured to break individually over a use life of the foam element and a second set of beads is configured to not break individually over the use life of the foam element.
398. The oil infused foam element of embodiment 116, wherein a first set of beads is configured to break individually over a use life of the foam element and a second set of beads is configured to not break individually over the use life of the foam element.
399. The oil infused foam element of embodiment 117, wherein a first set of beads is configured to break individually over a use life of the foam element and a second set of beads is configured to not break individually over the use life of the foam element.
400. The oil infused foam element of embodiment 118, wherein a first set of beads is configured to break individually over a use life of the foam element and a second set of beads is configured to not break individually over the use life of the foam element.
401. The oil infused foam element of embodiment 119, wherein a first set of beads is configured to break individually over a use life of the foam element and a second set of beads is configured to not break individually over the use life of the foam element.
402. The oil infused foam element of embodiment 120, wherein a first set of beads is configured to break individually over a use life of the foam element and a second set of beads is configured to not break individually over the use life of the foam element.
403. The oil infused foam element of embodiment 121, wherein a first set of beads is configured to break individually over a use life of the foam element and a second set of beads is configured to not break individually over the use life of the foam element.
404. The oil infused foam element of embodiment 122, wherein a first set of beads is configured to break individually over a use life of the foam element and a second set of beads is configured to not break individually over the use life of the foam element.
405. The oil infused foam element of embodiment 123, wherein a first set of beads is configured to break individually over a use life of the foam element and a second set of beads is configured to not break individually over the use life of the foam element.
406. The oil infused foam element of embodiment 124, wherein a first set of beads is configured to break individually over a use life of the foam element and a second set of beads is configured to not break individually over the use life of the foam element.
407. The oil infused foam element of embodiment 125, wherein a first set of beads is configured to break individually over a use life of the foam element and a second set of beads is configured to not break individually over the use life of the foam element.
408. The oil infused foam element of embodiment 126, wherein a first set of beads is configured to break individually over a use life of the foam element and a second set of beads is configured to not break individually over the use life of the foam element.
409. The oil infused foam element of embodiment 127, wherein a first set of beads is configured to break individually over a use life of the foam element and a second set of beads is configured to not break individually over the use life of the foam element.
410. The oil infused foam element of embodiment 128, wherein a first set of beads is configured to break individually over a use life of the foam element and a 411. The oil infused foam element of embodiment 129, wherein a first set of beads is configured to break individually over a use life of the foam element and a second set of beads is configured to not break individually over the use life of the foam element.

412. The oil infused foam element of embodiment 130 wherein a first set of beads is configured to break individually over a use life of the foam element and a second set of beads is configured to not break individually over the use life of the foam element.

413. The oil infused foam element of embodiment 131, wherein a first set of beads is configured to break individually over a use life of the foam element and a second set of beads is configured to not break individually over the use life of the foam element.

414. The oil infused foam element of embodiment 132, wherein a first set of beads is configured to break individually over a use life of the foam element and a second set of beads is configured to not break individually over the use life of the foam element.

415. The oil infused foam element of embodiment 133, wherein a first set of beads is configured to break individually over a use life of the foam element and a second set of beads is configured to not break individually over the use life of the foam element.

416. The oil infused foam element of embodiment 134, wherein a first set of beads is configured to break individually over a use life of the foam element and a second set of beads is configured to not break individually over the use life of the foam element.

417. The oil infused foam element of embodiment 135, wherein a first set of beads is configured to break individually over a use life of the foam element and a second set of beads is configured to not break individually over the use life of the foam element 418. The oil infused foam element of embodiment 136, wherein a first set of beads is configured to break individually over a use life of the foam element and a second set of beads is configured to not break individually over the use life of the foam element.

419. The oil infused foam element of embodiment 137, wherein a first set of beads is configured to break individually over a use life of the foam element and a second set of beads is configured to not break individually over the use life of the foam element.

420. The oil infused foam element of embodiment 138, wherein a first set of beads is configured to break individually over a use life of the foam element and a second set of beads is configured to not break individually over the use life of the foam element.

421. The oil infused foam element of embodiment 139, wherein a first set of beads is configured to break individually over a use life of the foam element and a second set of beads is configured to not break individually over the use life of the foam element.

422. The oil infused foam element of embodiment 140, wherein a first set of beads is configured to break individually over a use life of the foam element and a second set of beads is configured to not break individually over the use life of the foam element.

423. The oil infused foam element of embodiment 141, wherein a first set of beads is configured to break individually over a use life of the foam element and a second set of beads is configured to not break individually over the use life of the foam element.

424. The oil infused foam element of embodiment 1, wherein the oil is released as a vapor.

425. The oil infused foam element of embodiment 2, wherein the oil is released as a vapor.

426. The oil infused foam element of embodiment 3, wherein the oil is released as a vapor.

427. The oil infused foam element of embodiment 4, wherein the oil is released as a vapor.

428. The oil infused foam element of embodiment 5, wherein the oil is released as a vapor.

429. The oil infused foam element of embodiment 6, wherein the oil is released as a vapor.

430. The oil infused foam element of embodiment 7, wherein the oil is released as a vapor.

431. The oil infused foam element of embodiment 8, wherein the oil is released as a vapor.

432. The oil infused foam element of embodiment 9, wherein the oil is released as a vapor.

433. The oil infused foam element of embodiment 10, wherein the oil is released as a vapor.

434. The oil infused foam element of embodiment 11, wherein the oil is released as a vapor.

435. The oil infused foam element of embodiment 12, wherein the oil is released as a vapor.

436. The oil infused foam element of embodiment 13, wherein the oil is released as a vapor.

437. The oil infused foam element of embodiment 14, wherein the oil is released as a vapor.

438. The oil infused foam element of embodiment 15, wherein the oil is released as a vapor.

439. The oil infused foam element of embodiment 16, wherein the oil is released as a vapor.

440. The oil infused foam element of embodiment 17, wherein the oil is released as a vapor.

441. The oil infused foam element of embodiment 18, wherein the oil is released as a vapor.

442. The oil infused foam element of embodiment 19, wherein the oil is released as a vapor.

443. The oil infused foam element of embodiment 20, wherein the oil is released as a vapor.

444. The oil infused foam element of embodiment 21, wherein the oil is released as a vapor.

445. The oil infused foam element of embodiment 22, wherein the oil is released as a vapor.

446. The oil infused foam element of embodiment 23, wherein the oil is released as a vapor.

447. The oil infused foam element of embodiment 24, wherein the oil is released as a vapor.

448. The oil infused foam element of embodiment 25, wherein the oil is released as a vapor.

449. The oil infused foam element of embodiment 26, wherein the oil is released as a vapor.

450. The oil infused foam element of embodiment 27, wherein the oil is released as a vapor.

451. The oil infused foam element of embodiment 28, wherein the oil is released as a vapor.

452. The oil infused foam element of embodiment 29, wherein the oil is released as a vapor.

453. The oil infused foam element of embodiment 30, wherein the oil is released as a vapor.

454. The oil infused foam element of embodiment 31, wherein the oil is released as a vapor.

455. The oil infused foam element of embodiment 32, wherein the oil is released as a vapor.

456. The oil infused foam element of embodiment 33, wherein the oil is released as a vapor.

457. The oil infused foam element of embodiment 34, wherein the oil is released as a vapor.
458. The oil infused foam element of embodiment 35, wherein the oil is released as a vapor.
459. The oil infused foam element of embodiment 36, wherein the oil is released as a vapor.
460. The oil infused foam element of embodiment 37, wherein the oil is released as a vapor.
461. The oil infused foam element of embodiment 38, wherein the oil is released as a vapor.
462. The oil infused foam element of embodiment 39, wherein the oil is released as a vapor.
463. The oil infused foam element of embodiment 40, wherein the oil is released as a vapor.
464. The oil infused foam element of embodiment 41, wherein the oil is released as a vapor.
465. The oil infused foam element of embodiment 42, wherein the oil is released as a vapor.
466. The oil infused foam element of embodiment 43, wherein the oil is released as a vapor.
467. The oil infused foam element of embodiment 44, wherein the oil is released as a vapor.
468. The oil infused foam element of embodiment 45, wherein the oil is released as a vapor.
469. The oil infused foam element of embodiment 46, wherein the oil is released as a vapor.
470. The oil infused foam element of embodiment 47, wherein the oil is released as a vapor.
471. The oil infused foam element of embodiment 48, wherein the oil is released as a vapor.
472. The oil infused foam element of embodiment 49, wherein the oil is released as a vapor.
473. The oil infused foam element of embodiment 50, wherein the oil is released as a vapor.
474. The oil infused foam element of embodiment 51, wherein the oil is released as a vapor.
475. The oil infused foam element of embodiment 52, wherein the oil is released as a vapor.
476. The oil infused foam element of embodiment 53, wherein the oil is released as a vapor.
477. The oil infused foam element of embodiment 54, wherein the oil is released as a vapor.
478. The oil infused foam element of embodiment 55, wherein the oil is released as a vapor.
479. The oil infused foam element of embodiment 56, wherein the oil is released as a vapor.
480. The oil infused foam element of embodiment 57, wherein the oil is released as a vapor.
481. The oil infused foam element of embodiment 58, wherein the oil is released as a vapor.
482. The oil infused foam element of embodiment 59, wherein the oil is released as a vapor.
483. The oil infused foam element of embodiment 60, wherein the oil is released as a vapor.
484. The oil infused foam element of embodiment 61, wherein the oil is released as a vapor.
485. The oil infused foam element of embodiment 62, wherein the oil is released as a vapor.
486. The oil infused foam element of embodiment 63, wherein the oil is released as a vapor.
487. The oil infused foam element of embodiment 64, wherein the oil is released as a vapor.
488. The oil infused foam element of embodiment 65, wherein the oil is released as a vapor.
489. The oil infused foam element of embodiment 66, wherein the oil is released as a vapor.
490. The oil infused foam element of embodiment 67, wherein the oil is released as a vapor.
491. The oil infused foam element of embodiment 68, wherein the oil is released as a vapor.
492. The oil infused foam element of embodiment 69, wherein the oil is released as a vapor.
493. The oil infused foam element of embodiment 70, wherein the oil is released as a vapor.
494. The oil infused foam element of embodiment 71, wherein the oil is released as a vapor.
495. The oil infused foam element of embodiment 72, wherein the oil is released as a vapor.
496. The oil infused foam element of embodiment 73, wherein the oil is released as a vapor.
497. The oil infused foam element of embodiment 74 wherein the oil is released as a vapor.
498. The oil infused foam element of embodiment 74, wherein the oil is released as a vapor.
499. The oil infused foam element of embodiment 76, wherein the oil is released as a vapor.
500. The oil infused foam element of embodiment 77, wherein the oil is released as a vapor.
501. The oil infused foam element of embodiment 78, wherein the oil is released as a vapor.
502. The oil infused foam element of embodiment 79, wherein the oil is released as a vapor.
503. The oil infused foam element of embodiment 80, wherein the oil is released as a vapor.
504. The oil infused foam element of embodiment 81, wherein the oil is released as a vapor.
505. The oil infused foam element of embodiment 82, wherein the oil is released as a vapor.
506. The oil infused foam element of embodiment 83, wherein the oil is released as a vapor.
507. The oil infused foam element of embodiment 84, wherein the oil is released as a vapor.
508. The oil infused foam element of embodiment 85, wherein the oil is released as a vapor.
509. The oil infused foam element of embodiment 86, wherein the oil is released as a vapor.
510. The oil infused foam element of embodiment 87, wherein the oil is released as a vapor.
511. The oil infused foam element of embodiment 88, wherein the oil is released as a vapor.
512. The oil infused foam element of embodiment 89, wherein the oil is released as a vapor.
513. The oil infused foam element of embodiment 90, wherein the oil is released as a vapor.
514. The oil infused foam element of embodiment 91, wherein the oil is released as a vapor.
515. The oil infused foam element of embodiment 92, wherein the oil is released as a vapor.
516. The oil infused foam element of embodiment 93, wherein the oil is released as a vapor.
517. The oil infused foam element of embodiment 94, wherein the oil is released as a vapor.
518. The oil infused foam element of embodiment 95, wherein the oil is released as a vapor.
519. The oil infused foam element of embodiment 96, wherein the oil is released as a vapor.
520. The oil infused foam element of embodiment 97, wherein the oil is released as a vapor.
521. The oil infused foam element of embodiment 98, wherein the oil is released as a vapor.
522. The oil infused foam element of embodiment 99, wherein the oil is released as a vapor.

523. The oil infused foam element of embodiment 100, wherein the oil is released as a vapor.
524. The oil infused foam element of embodiment 101, wherein the oil is released as a vapor.
525. The oil infused foam element of embodiment 102, wherein the oil is released as a vapor.
526. The oil infused foam element of embodiment 103, wherein the oil is released as a vapor.
527. The oil infused foam element of embodiment 104, wherein the oil is released as a vapor.
528. The oil infused foam element of embodiment 105, wherein the oil is released as a vapor.
529. The oil infused foam element of embodiment 106, wherein the oil is released as a vapor.
530. The oil infused foam element of embodiment 107, wherein the oil is released as a vapor.
531. The oil infused foam element of embodiment 108, wherein the oil is released as a vapor.
532. The oil infused foam element of embodiment 109, wherein the oil is released as a vapor.
533. The oil infused foam element of embodiment 110, wherein the oil is released as a vapor.
534. The oil infused foam element of embodiment 111, wherein the oil is released as a vapor.
535. The oil infused foam element of embodiment 112, wherein the oil is released as a vapor.
536. The oil infused foam element of embodiment 113, wherein the oil is released as a vapor.
537. The oil infused foam element of embodiment 114, wherein the oil is released as a vapor.
538. The oil infused foam element of embodiment 115, wherein the oil is released as a vapor.
539. The oil infused foam element of embodiment 116, wherein the oil is released as a vapor.
540. The oil infused foam element of embodiment 117, wherein the oil is released as a vapor.
541. The oil infused foam element of embodiment 118, wherein the oil is released as a vapor.
542. The oil infused foam element of embodiment 119, wherein the oil is released as a vapor.
543. The oil infused foam element of embodiment 120, wherein the oil is released as a vapor.
544. The oil infused foam element of embodiment 121, wherein the oil is released as a vapor.
545. The oil infused foam element of embodiment 122, wherein the oil is released as a vapor.
546. The oil infused foam element of embodiment 123, wherein the oil is released as a vapor.
547. The oil infused foam element of embodiment 124, wherein the oil is released as a vapor.
548. The oil infused foam element of embodiment 125, wherein the oil is released as a vapor.
549. The oil infused foam element of embodiment 126, wherein the oil is released as a vapor.
550. The oil infused foam element of embodiment 127, wherein the oil is released as a vapor.
551. The oil infused foam element of embodiment 128, wherein the oil is released as a vapor.
552. The oil infused foam element of embodiment 129, wherein the oil is released as a vapor.
553. The oil infused foam element of embodiment 130, wherein the oil is released as a vapor.
554. The oil infused foam element of embodiment 131, wherein the oil is released as a vapor.
555. The oil infused foam element of embodiment 132, wherein the oil is released as a vapor.
556. The oil infused foam element of embodiment 133, wherein the oil is released as a vapor.
557. The oil infused foam element of embodiment 134, wherein the oil is released as a vapor.
558. The oil infused foam element of embodiment 135, wherein the oil is released as a vapor.
559. The oil infused foam element of embodiment 136, wherein the oil is released as a vapor.
560. The oil infused foam element of embodiment 137, wherein the oil is released as a vapor.
561. The oil infused foam element of embodiment 138, wherein the oil is released as a vapor.
562. The oil infused foam element of embodiment 139, wherein the oil is released as a vapor.
563. The oil infused foam element of embodiment 140, wherein the oil is released as a vapor.
564. The oil infused foam element of embodiment 141, wherein the oil is released as a vapor.
565. The oil infused foam element of embodiment 142, wherein the oil is released as a vapor.
566. The oil infused foam element of embodiment 143, wherein the oil is released as a vapor.
567. The oil infused foam element of embodiment 144, wherein the oil is released as a vapor.
568. The oil infused foam element of embodiment 145, wherein the oil is released as a vapor.
569. The oil infused foam element of embodiment 146, wherein the oil is released as a vapor.
570. The oil infused foam element of embodiment 147, wherein the oil is released as a vapor.
571. The oil infused foam element of embodiment 148, wherein the oil is released as a vapor.
572. The oil infused foam element of embodiment 149, wherein the oil is released as a vapor.
573. The oil infused foam element of embodiment 150, wherein the oil is released as a vapor.
574. The oil infused foam element of embodiment 151, wherein the oil is released as a vapor.
575. The oil infused foam element of embodiment 152, wherein the oil is released as a vapor.
576. The oil infused foam element of embodiment 153, wherein the oil is released as a vapor.
577. The oil infused foam element of embodiment 154, wherein the oil is released as a vapor.
578. The oil infused foam element of embodiment 155, wherein the oil is released as a vapor.
579. The oil infused foam element of embodiment 156, wherein the oil is released as a vapor.
580. The oil infused foam element of embodiment 157, wherein the oil is released as a vapor.
581. The oil infused foam element of embodiment 158, wherein the oil is released as a vapor.
582. The oil infused foam element of embodiment 159, wherein the oil is released as a vapor.
583. The oil infused foam element of embodiment 160, wherein the oil is released as a vapor.
584. The oil infused foam element of embodiment 161, wherein the oil is released as a vapor.
585. The oil infused foam element of embodiment 162, wherein the oil is released as a vapor.
586. The oil infused foam element of embodiment 163, wherein the oil is released as a vapor.
587. The oil infused foam element of embodiment 164, wherein the oil is released as a vapor.
588. The oil infused foam element of embodiment 165, wherein the oil is released as a vapor.

589. The oil infused foam element of embodiment 166, wherein the oil is released as a vapor.
590. The oil infused foam element of embodiment 167, wherein the oil is released as a vapor.
591. The oil infused foam element of embodiment 168, wherein the oil is released as a vapor.
592. The oil infused foam element of embodiment 169, wherein the oil is released as a vapor.
593. The oil infused foam element of embodiment 170, wherein the oil is released as a vapor.
594. The oil infused foam element of embodiment 171, wherein the oil is released as a vapor.
595. The oil infused foam element of embodiment 172, wherein the oil is released as a vapor.
596. The oil infused foam element of embodiment 173, wherein the oil is released as a vapor.
597. The oil infused foam element of embodiment 174, wherein the oil is released as a vapor.
598. The oil infused foam element of embodiment 175, wherein the oil is released as a vapor.
599. The oil infused foam element of embodiment 176, wherein the oil is released as a vapor.
600. The oil infused foam element of embodiment 177, wherein the oil is released as a vapor.
601. The oil infused foam element of embodiment 178, wherein the oil is released as a vapor.
602. The oil infused foam element of embodiment 179, wherein the oil is released as a vapor.
603. The oil infused foam element of embodiment 180, wherein the oil is released as a vapor.
604. The oil infused foam element of embodiment 181, wherein the oil is released as a vapor.
605. The oil infused foam element of embodiment 182, wherein the oil is released as a vapor.
606. The oil infused foam element of embodiment 183, wherein the oil is released as a vapor.
607. The oil infused foam element of embodiment 184, wherein the oil is released as a vapor.
608. The oil infused foam element of embodiment 185, wherein the oil is released as a vapor.
609. The oil infused foam element of embodiment 186, wherein the oil is released as a vapor.
610. The oil infused foam element of embodiment 187, wherein the oil is released as a vapor.
611. The oil infused foam element of embodiment 188, wherein the oil is released as a vapor.
612. The oil infused foam element of embodiment 189, wherein the oil is released as a vapor.
613. The oil infused foam element of embodiment 190, wherein the oil is released as a vapor.
614. The oil infused foam element of embodiment 191, wherein the oil is released as a vapor.
615. The oil infused foam element of embodiment 192, wherein the oil is released as a vapor.
616. The oil infused foam element of embodiment 193, wherein the oil is released as a vapor.
617. The oil infused foam element of embodiment 194, wherein the oil is released as a vapor.
618. The oil infused foam element of embodiment 195, wherein the oil is released as a vapor.
619. The oil infused foam element of embodiment 196, wherein the oil is released as a vapor.
620. The oil infused foam element of embodiment 197, wherein the oil is released as a vapor.
621. The oil infused foam element of embodiment 198, wherein the oil is released as a vapor.
622. The oil infused foam element of embodiment 199, wherein the oil is released as a vapor.
623. The oil infused foam element of embodiment 200, wherein the oil is released as a vapor.
624. The oil infused foam element of embodiment 201, wherein the oil is released as a vapor.
625. The oil infused foam element of embodiment 202, wherein the oil is released as a vapor.
626. The oil infused foam element of embodiment 203, wherein the oil is released as a vapor.
627. The oil infused foam element of embodiment 204, wherein the oil is released as a vapor.
628. The oil infused foam element of embodiment 205, wherein the oil is released as a vapor.
629. The oil infused foam element of embodiment 206, wherein the oil is released as a vapor.
630. The oil infused foam element of embodiment 207, wherein the oil is released as a vapor.
631. The oil infused foam element of embodiment 208, wherein the oil is released as a vapor.
632. The oil infused foam element of embodiment 209, wherein the oil is released as a vapor.
633. The oil infused foam element of embodiment 210, wherein the oil is released as a vapor.
634. The oil infused foam element of embodiment 211, wherein the oil is released as a vapor.
635. The oil infused foam element of embodiment 212, wherein the oil is released as a vapor.
636. The oil infused foam element of embodiment 213, wherein the oil is released as a vapor.
637. The oil infused foam element of embodiment 214, wherein the oil is released as a vapor.
638. The oil infused foam element of embodiment 215, wherein the oil is released as a vapor.
639. The oil infused foam element of embodiment 216, wherein the oil is released as a vapor.
640. The oil infused foam element of embodiment 217, wherein the oil is released as a vapor.
641. The oil infused foam element of embodiment 218, wherein the oil is released as a vapor.
642. The oil infused foam element of embodiment 219, wherein the oil is released as a vapor.
643. The oil infused foam element of embodiment 220, wherein the oil is released as a vapor.
644. The oil infused foam element of embodiment 221, wherein the oil is released as a vapor.
645. The oil infused foam element of embodiment 222, wherein the oil is released as a vapor.
646. The oil infused foam element of embodiment 223, wherein the oil is released as a vapor.
647. The oil infused foam element of embodiment 224, wherein the oil is released as a vapor.
648. The oil infused foam element of embodiment 225, wherein the oil is released as a vapor.
649. The oil infused foam element of embodiment 226, wherein the oil is released as a vapor.
650. The oil infused foam element of embodiment 227, wherein the oil is released as a vapor.
651. The oil infused foam element of embodiment 228, wherein the oil is released as a vapor.
652. The oil infused foam element of embodiment 229, wherein the oil is released as a vapor.
653. The oil infused foam element of embodiment 230, wherein the oil is released as a vapor.
654. The oil infused foam element of embodiment 231, wherein the oil is released as a vapor.

655. The oil infused foam element of embodiment 232, wherein the oil is released as a vapor.
656. The oil infused foam element of embodiment 233, wherein the oil is released as a vapor.
657. The oil infused foam element of embodiment 234, wherein the oil is released as a vapor.
658. The oil infused foam element of embodiment 235, wherein the oil is released as a vapor.
659. The oil infused foam element of embodiment 236, wherein the oil is released as a vapor.
660. The oil infused foam element of embodiment 237, wherein the oil is released as a vapor.
661. The oil infused foam element of embodiment 238, wherein the oil is released as a vapor.
662. The oil infused foam element of embodiment 239, wherein the oil is released as a vapor.
663. The oil infused foam element of embodiment 240, wherein the oil is released as a vapor.
664. The oil infused foam element of embodiment 241, wherein the oil is released as a vapor.
665. The oil infused foam element of embodiment 242, wherein the oil is released as a vapor.
666. The oil infused foam element of embodiment 243, wherein the oil is released as a vapor.
667. The oil infused foam element of embodiment 244, wherein the oil is released as a vapor.
668. The oil infused foam element of embodiment 245, wherein the oil is released as a vapor.
669. The oil infused foam element of embodiment 246, wherein the oil is released as a vapor.
670. The oil infused foam element of embodiment 247, wherein the oil is released as a vapor.
671. The oil infused foam element of embodiment 248, wherein the oil is released as a vapor.
672. The oil infused foam element of embodiment 249, wherein the oil is released as a vapor.
673. The oil infused foam element of embodiment 250, wherein the oil is released as a vapor.
674. The oil infused foam element of embodiment 251, wherein the oil is released as a vapor.
675. The oil infused foam element of embodiment 252, wherein the oil is released as a vapor.
676. The oil infused foam element of embodiment 253, wherein the oil is released as a vapor.
677. The oil infused foam element of embodiment 254, wherein the oil is released as a vapor.
678. The oil infused foam element of embodiment 255, wherein the oil is released as a vapor.
679. The oil infused foam element of embodiment 256, wherein the oil is released as a vapor.
680. The oil infused foam element of embodiment 257, wherein the oil is released as a vapor.
681. The oil infused foam element of embodiment 258, wherein the oil is released as a vapor.
682. The oil infused foam element of embodiment 259, wherein the oil is released as a vapor.
683. The oil infused foam element of embodiment 260, wherein the oil is released as a vapor.
684. The oil infused foam element of embodiment 261, wherein the oil is released as a vapor.
685. The oil infused foam element of embodiment 262, wherein the oil is released as a vapor.
686. The oil infused foam element of embodiment 263, wherein the oil is released as a vapor.
687. The oil infused foam element of embodiment 264, wherein the oil is released as a vapor.
688. The oil infused foam element of embodiment 265, wherein the oil is released as a vapor.
689. The oil infused foam element of embodiment 266, wherein the oil is released as a vapor.
690. The oil infused foam element of embodiment 267, wherein the oil is released as a vapor.
691. The oil infused foam element of embodiment 268, wherein the oil is released as a vapor.
692. The oil infused foam element of embodiment 269, wherein the oil is released as a vapor.
693. The oil infused foam element of embodiment 270, wherein the oil is released as a vapor.
694. The oil infused foam element of embodiment 271, wherein the oil is released as a vapor.
695. The oil infused foam element of embodiment 272, wherein the oil is released as a vapor.
696. The oil infused foam element of embodiment 273, wherein the oil is released as a vapor.
697. The oil infused foam element of embodiment 274, wherein the oil is released as a vapor.
698. The oil infused foam element of embodiment 275, wherein the oil is released as a vapor.
699. The oil infused foam element of embodiment 276, wherein the oil is released as a vapor.
700. The oil infused foam element of embodiment 277, wherein the oil is released as a vapor.
701. The oil infused foam element of embodiment 278, wherein the oil is released as a vapor.
702. The oil infused foam element of embodiment 279, wherein the oil is released as a vapor.
703. The oil infused foam element of embodiment 280, wherein the oil is released as a vapor.
704. The oil infused foam element of embodiment 281, wherein the oil is released as a vapor.
705. The oil infused foam element of embodiment 282, wherein the oil is released as a vapor.
706. The oil infused foam element of embodiment 283, wherein the oil is released as a vapor.
707. The oil infused foam element of embodiment 284, wherein the oil is released as a vapor.
708. The oil infused foam element of embodiment 285, wherein the oil is released as a vapor.
709. The oil infused foam element of embodiment 286, wherein the oil is released as a vapor.
710. The oil infused foam element of embodiment 287, wherein the oil is released as a vapor.
711. The oil infused foam element of embodiment 288, wherein the oil is released as a vapor.
712. The oil infused foam element of embodiment 289, wherein the oil is released as a vapor.
713. The oil infused foam element of embodiment 290, wherein the oil is released as a vapor.
714. The oil infused foam element of embodiment 291, wherein the oil is released as a vapor.
715. The oil infused foam element of embodiment 292, wherein the oil is released as a vapor.
716. The oil infused foam element of embodiment 293, wherein the oil is released as a vapor.
717. The oil infused foam element of embodiment 294, wherein the oil is released as a vapor.
718. The oil infused foam element of embodiment 295, wherein the oil is released as a vapor.
719. The oil infused foam element of embodiment 296, wherein the oil is released as a vapor.
720. The oil infused foam element of embodiment 297, wherein the oil is released as a vapor.

721. The oil infused foam element of embodiment 298, wherein the oil is released as a vapor.
722. The oil infused foam element of embodiment 299, wherein the oil is released as a vapor.
723. The oil infused foam element of embodiment 300, wherein the oil is released as a vapor.
724. The oil infused foam element of embodiment 301, wherein the oil is released as a vapor.
725. The oil infused foam element of embodiment 302, wherein the oil is released as a vapor.
726. The oil infused foam element of embodiment 303, wherein the oil is released as a vapor.
727. The oil infused foam element of embodiment 304, wherein the oil is released as a vapor.
728. The oil infused foam element of embodiment 305, wherein the oil is released as a vapor.
729. The oil infused foam element of embodiment 306, wherein the oil is released as a vapor.
730. The oil infused foam element of embodiment 307, wherein the oil is released as a vapor.
731. The oil infused foam element of embodiment 308, wherein the oil is released as a vapor.
732. The oil infused foam element of embodiment 309, wherein the oil is released as a vapor.
733. The oil infused foam element of embodiment 310, wherein the oil is released as a vapor.
734. The oil infused foam element of embodiment 311, wherein the oil is released as a vapor.
735. The oil infused foam element of embodiment 312, wherein the oil is released as a vapor.
736. The oil infused foam element of embodiment 313, wherein the oil is released as a vapor.
737. The oil infused foam element of embodiment 314, wherein the oil is released as a vapor.
738. The oil infused foam element of embodiment 315, wherein the oil is released as a vapor.
739. The oil infused foam element of embodiment 316, wherein the oil is released as a vapor.
740. The oil infused foam element of embodiment 317, wherein the oil is released as a vapor.
741. The oil infused foam element of embodiment 318, wherein the oil is released as a vapor.
742. The oil infused foam element of embodiment 319, wherein the oil is released as a vapor.
743. The oil infused foam element of embodiment 320, wherein the oil is released as a vapor.
744. The oil infused foam element of embodiment 321, wherein the oil is released as a vapor.
745. The oil infused foam element of embodiment 322, wherein the oil is released as a vapor.
746. The oil infused foam element of embodiment 323, wherein the oil is released as a vapor.
747. The oil infused foam element of embodiment 324, wherein the oil is released as a vapor.
748. The oil infused foam element of embodiment 325, wherein the oil is released as a vapor.
749. The oil infused foam element of embodiment 326, wherein the oil is released as a vapor.
750. The oil infused foam element of embodiment 327, wherein the oil is released as a vapor.
751. The oil infused foam element of embodiment 328, wherein the oil is released as a vapor.
752. The oil infused foam element of embodiment 329, wherein the oil is released as a vapor.
753. The oil infused foam element of embodiment 330, wherein the oil is released as a vapor.
754. The oil infused foam element of embodiment 331, wherein the oil is released as a vapor.
755. The oil infused foam element of embodiment 332, wherein the oil is released as a vapor.
756. The oil infused foam element of embodiment 333, wherein the oil is released as a vapor.
757. The oil infused foam element of embodiment 334, wherein the oil is released as a vapor.
758. The oil infused foam element of embodiment 335, wherein the oil is released as a vapor.
759. The oil infused foam element of embodiment 336, wherein the oil is released as a vapor.
760. The oil infused foam element of embodiment 337, wherein the oil is released as a vapor.
761. The oil infused foam element of embodiment 338, wherein the oil is released as a vapor.
762. The oil infused foam element of embodiment 339, wherein the oil is released as a vapor.
763. The oil infused foam element of embodiment 340, wherein the oil is released as a vapor.
764. The oil infused foam element of embodiment 341, wherein the oil is released as a vapor.
765. The oil infused foam element of embodiment 342, wherein the oil is released as a vapor.
766. The oil infused foam element of embodiment 343, wherein the oil is released as a vapor.
767. The oil infused foam element of embodiment 344, wherein the oil is released as a vapor.
768. The oil infused foam element of embodiment 345, wherein the oil is released as a vapor.
769. The oil infused foam element of embodiment 346, wherein the oil is released as a vapor.
770. The oil infused foam element of embodiment 347, wherein the oil is released as a vapor.
771. The oil infused foam element of embodiment 348, wherein the oil is released as a vapor.
772. The oil infused foam element of embodiment 349, wherein the oil is released as a vapor.
773. The oil infused foam element of embodiment 350, wherein the oil is released as a vapor.
774. The oil infused foam element of embodiment 351, wherein the oil is released as a vapor.
775. The oil infused foam element of embodiment 352, wherein the oil is released as a vapor.
776. The oil infused foam element of embodiment 353, wherein the oil is released as a vapor.
777. The oil infused foam element of embodiment 354, wherein the oil is released as a vapor.
778. The oil infused foam element of embodiment 355, wherein the oil is released as a vapor.
779. The oil infused foam element of embodiment 356, wherein the oil is released as a vapor.
780. The oil infused foam element of embodiment 357, wherein the oil is released as a vapor.
781. The oil infused foam element of embodiment 358, wherein the oil is released as a vapor.
782. The oil infused foam element of embodiment 359, wherein the oil is released as a vapor.
783. The oil infused foam element of embodiment 360, wherein the oil is released as a vapor.
784. The oil infused foam element of embodiment 361, wherein the oil is released as a vapor.
785. The oil infused foam element of embodiment 362, wherein the oil is released as a vapor.
786. The oil infused foam element of embodiment 363, wherein the oil is released as a vapor.

787. The oil infused foam element of embodiment 364, wherein the oil is released as a vapor.
788. The oil infused foam element of embodiment 365, wherein the oil is released as a vapor.
789. The oil infused foam element of embodiment 366, wherein the oil is released as a vapor.
790. The oil infused foam element of embodiment 367, wherein the oil is released as a vapor.
791. The oil infused foam element of embodiment 368, wherein the oil is released as a vapor.
792. The oil infused foam element of embodiment 369, wherein the oil is released as a vapor.
793. The oil infused foam element of embodiment 370, wherein the oil is released as a vapor.
794. The oil infused foam element of embodiment 371, wherein the oil is released as a vapor.
795. The oil infused foam element of embodiment 372, wherein the oil is released as a vapor.
796. The oil infused foam element of embodiment 373, wherein the oil is released as a vapor.
797. The oil infused foam element of embodiment 374, wherein the oil is released as a vapor.
798. The oil infused foam element of embodiment 375, wherein the oil is released as a vapor.
799. The oil infused foam element of embodiment 376, wherein the oil is released as a vapor.
800. The oil infused foam element of embodiment 377, wherein the oil is released as a vapor.
801. The oil infused foam element of embodiment 378, wherein the oil is released as a vapor.
802. The oil infused foam element of embodiment 379, wherein the oil is released as a vapor.
803. The oil infused foam element of embodiment 380, wherein the oil is released as a vapor.
804. The oil infused foam element of embodiment 381, wherein the oil is released as a vapor.
805. The oil infused foam element of embodiment 382, wherein the oil is released as a vapor.
806. The oil infused foam element of embodiment 383, wherein the oil is released as a vapor.
807. The oil infused foam element of embodiment 384, wherein the oil is released as a vapor.
808. The oil infused foam element of embodiment 385, wherein the oil is released as a vapor.
809. The oil infused foam element of embodiment 386, wherein the oil is released as a vapor.
810. The oil infused foam element of embodiment 387, wherein the oil is released as a vapor.
811. The oil infused foam element of embodiment 388, wherein the oil is released as a vapor.
812. The oil infused foam element of embodiment 389, wherein the oil is released as a vapor.
813. The oil infused foam element of embodiment 390, wherein the oil is released as a vapor.
814. The oil infused foam element of embodiment 391, wherein the oil is released as a vapor.
815. The oil infused foam element of embodiment 392, wherein the oil is released as a vapor.
816. The oil infused foam element of embodiment 393, wherein the oil is released as a vapor.
817. The oil infused foam element of embodiment 394, wherein the oil is released as a vapor.
818. The oil infused foam element of embodiment 395, wherein the oil is released as a vapor.
819. The oil infused foam element of embodiment 396, wherein the oil is released as a vapor.
820. The oil infused foam element of embodiment 397, wherein the oil is released as a vapor.
821. The oil infused foam element of embodiment 398, wherein the oil is released as a vapor.
822. The oil infused foam element of embodiment 399, wherein the oil is released as a vapor.
823. The oil infused foam element of embodiment 400, wherein the oil is released as a vapor.
824. The oil infused foam element of embodiment 401, wherein the oil is released as a vapor.
825. The oil infused foam element of embodiment 402, wherein the oil is released as a vapor.
826. The oil infused foam element of embodiment 403, wherein the oil is released as a vapor.
827. The oil infused foam element of embodiment 404, wherein the oil is released as a vapor.
828. The oil infused foam element of embodiment 405, wherein the oil is released as a vapor.
829. The oil infused foam element of embodiment 406, wherein the oil is released as a vapor.
830. The oil infused foam element of embodiment 407, wherein the oil is released as a vapor.
831. The oil infused foam element of embodiment 408, wherein the oil is released as a vapor.
832. The oil infused foam element of embodiment 409, wherein the oil is released as a vapor.
833. The oil infused foam element of embodiment 410, wherein the oil is released as a vapor.
834. The oil infused foam element of embodiment 411, wherein the oil is released as a vapor.
835. The oil infused foam element of embodiment 412, wherein the oil is released as a vapor.
836. The oil infused foam element of embodiment 413, wherein the oil is released as a vapor.
837. The oil infused foam element of embodiment 414, wherein the oil is released as a vapor.
838. The oil infused foam element of embodiment 415, wherein the oil is released as a vapor.
839. The oil infused foam element of embodiment 416, wherein the oil is released as a vapor.
840. The oil infused foam element of embodiment 417, wherein the oil is released as a vapor.
841. The oil infused foam element of embodiment 418, wherein the oil is released as a vapor.
842. The oil infused foam element of embodiment 419, wherein the oil is released as a vapor.
843. The oil infused foam element of embodiment 420, wherein the oil is released as a vapor.
844. The oil infused foam element of embodiment 421, wherein the oil is released as a vapor.
845. The oil infused foam element of embodiment 422, wherein the oil is released as a vapor.
846. The oil infused foam element of embodiment 423, wherein the oil is released as a vapor.
847. The oil infused foam element of any one of embodiments 1 through 846, wherein the foam element comprises a mattress.
848. The oil infused foam element of any one of embodiments 1 through 846, wherein the foam element comprises a pillow.
849. The oil infused foam element of any one of embodiments 1 through 846, wherein the foam element comprises a seating surface.
850. The oil infused foam element of any one of embodiments 1 through 846, wherein the foam element comprises a sleeping surface.

851. A cannabidiol infused foam element comprising cannabidiol and foam.
852. The cannabidiol infused foam element of embodiment 851, wherein the cannabidiol infused foam element comprises a plurality of layers at least one of the plurality of layers comprises the cannabidiol.
853. The cannabidiol infused foam element of embodiment 852, wherein the cannabidiol is located in a layer which will not be directly contacted by a user.
854. The cannabidiol infused foam element of embodiment 852, wherein the cannabidiol is located in a layer which will be directly contacted by a user.
855. The cannabidiol infused foam element of embodiment 853, wherein more than one of the plurality of layers is infused with cannabidiol.
856. The cannabidiol infused foam element of embodiment 851, wherein the cannabidiol is released from the foam as a vapor.
857. The cannabidiol infused foam element of embodiment 854, wherein each of the plurality of layers is infused with cannabidiol.
858. The cannabidiol infused foam element of embodiment 851, where in the cannabidiol comprises powder.
859. The cannabidiol infused foam element of embodiment 852, where in the cannabidiol comprises powder.
860. The cannabidiol infused foam element of embodiment 853, where in the cannabidiol comprises powder.
861. The cannabidiol infused foam element of embodiment 854, where in the cannabidiol comprises powder.
862. The cannabidiol infused foam element of embodiment 855, where in the cannabidiol comprises powder.
863. The cannabidiol infused foam element of embodiment 856, where in the cannabidiol comprises powder.
864. The cannabidiol infused foam element of embodiment 857, where in the cannabidiol comprises powder.
865. The cannabidiol infused foam element of embodiment 851, where in the cannabidiol comprises oil.
866. The cannabidiol infused foam element of embodiment 852, where in the cannabidiol comprises oil.
867. The cannabidiol infused foam element of embodiment 853, where in the cannabidiol comprises oil.
868. The cannabidiol infused foam element of embodiment 854, where in the cannabidiol comprises oil.
869. The cannabidiol infused foam element of embodiment 855, where in the cannabidiol comprises oil.
870. The cannabidiol infused foam element of embodiment 856, where in the cannabidiol comprises oil.
871. The cannabidiol infused foam element of embodiment 857, where in the cannabidiol comprises oil.
872. The cannabidiol infused foam element of embodiment 865, where in the cannabidiol further comprises powder.
873. The cannabidiol infused foam element of embodiment 866, where in the cannabidiol further comprises powder.
874. The cannabidiol infused foam element of embodiment 867, where in the cannabidiol further comprises powder.
875. The cannabidiol infused foam element of embodiment 868, where in the cannabidiol further comprises powder.
876. The cannabidiol infused foam element of embodiment 869, where in the cannabidiol further comprises powder.
877. The cannabidiol infused foam element of embodiment 870, where in the cannabidiol further comprises powder.
878. The cannabidiol infused foam element of embodiment 871, where in the cannabidiol further comprises powder.
879. The cannabidiol infused foam element of embodiment 865, wherein the oil is encapsulated in beads.
880. The cannabidiol infused foam element of embodiment 866, wherein the oil is encapsulated in beads.
881. The cannabidiol infused foam element of embodiment 867, wherein the oil is encapsulated in beads.
882. The cannabidiol infused foam element of embodiment 868, wherein the oil is encapsulated in beads.
883. The cannabidiol infused foam element of embodiment 869, wherein the oil is encapsulated in beads.
884. The cannabidiol infused foam element of embodiment 870, wherein the oil is encapsulated in beads.
885. The cannabidiol infused foam element of embodiment 871, wherein the oil is encapsulated in beads.
886. The cannabidiol infused foam element of embodiment 872, wherein the oil is encapsulated in beads.
887. The cannabidiol infused foam element of embodiment 873, wherein the oil is encapsulated in beads.
888. The cannabidiol infused foam element of embodiment 874, wherein the oil is encapsulated in beads.
889. The cannabidiol infused foam element of embodiment 875, wherein the oil is encapsulated in beads.
890. The cannabidiol infused foam element of embodiment 876, wherein the oil is encapsulated in beads.
891. The cannabidiol infused foam element of embodiment 877, wherein the oil is encapsulated in beads.
892. The cannabidiol infused foam element of embodiment 878, wherein the oil is encapsulated in beads.
893. The cannabidiol infused foam element of embodiment 879, wherein the beads are dispersed throughout the foam.
894. The cannabidiol infused foam element of embodiment 880, wherein the beads are dispersed throughout the foam.
895. The cannabidiol infused foam element of embodiment 881, wherein the beads are dispersed throughout the foam.
896. The cannabidiol infused foam element of embodiment 882, wherein the beads are dispersed throughout the foam.
897. The cannabidiol infused foam element of embodiment 883, wherein the beads are dispersed throughout the foam.
898. The cannabidiol infused foam element of embodiment 884, wherein the beads are dispersed throughout the foam.
899. The cannabidiol infused foam element of embodiment 885, wherein the beads are dispersed throughout the foam.
900. The cannabidiol infused foam element of embodiment 886, wherein the beads are dispersed throughout the foam.
901. The cannabidiol infused foam element of embodiment 887, wherein the beads are dispersed throughout the foam.
902. The cannabidiol infused foam element of embodiment 888, wherein the beads are dispersed throughout the foam.
903. The cannabidiol infused foam element of embodiment 889, wherein the beads are dispersed throughout the foam.
904. The cannabidiol infused foam element of embodiment 890, wherein the beads are dispersed throughout the foam.

905. The cannabidiol infused foam element of embodiment 891, wherein the beads are configured to break individually over a use life of the foam element.
906. The cannabidiol infused foam element of embodiment 892, wherein the beads are configured to break individually over a use life of the foam element.
907. The cannabidiol infused foam element of embodiment 893, wherein the beads are configured to break individually over a use life of the foam element.
908. The cannabidiol infused foam element of embodiment 894, wherein the beads are configured to break individually over a use life of the foam element.
909. The cannabidiol infused foam element of embodiment 895, wherein the beads are configured to break individually over a use life of the foam element.
910. The cannabidiol infused foam element of embodiment 896, wherein the beads are configured to break individually over a use life of the foam element.
911. The cannabidiol infused foam element of embodiment 897, wherein the beads are configured to break individually over a use life of the foam element.
912. The cannabidiol infused foam element of embodiment 898, wherein the beads are configured to break individually over a use life of the foam element.
913. The cannabidiol infused foam element of embodiment 899, wherein the beads are configured to break individually over a use life of the foam element.
914. The cannabidiol infused foam element of embodiment 900, wherein the beads are configured to break individually over a use life of the foam element.
915. The cannabidiol infused foam element of embodiment 901, wherein the beads are configured to break individually over a use life of the foam element.
916. The cannabidiol infused foam element of embodiment 902, wherein the beads are configured to break individually over a use life of the foam element.
917. The cannabidiol infused foam element of embodiment 903, wherein the beads are configured to break individually over a use life of the foam element.
918. The cannabidiol infused foam element of embodiment 904, wherein the beads are configured to break individually over a use life of the foam element due to being subject to pressure applied by a user of the foam element.
919. The cannabidiol infused foam element of embodiment 905, wherein the beads are configured to break individually over a use life of the foam element due to being subject to pressure applied by a user of the foam element.
920. The cannabidiol infused foam element of embodiment 906, wherein the beads are configured to break individually over a use life of the foam element due to being subject to pressure applied by a user of the foam element.
921. The cannabidiol infused foam element of embodiment 907, wherein the beads are configured to break individually over a use life of the foam element due to being subject to pressure applied by a user of the foam element.
922. The cannabidiol infused foam element of embodiment 908, wherein the beads are configured to break individually over a use life of the foam element due to being subject to pressure applied by a user of the foam element.
923. The cannabidiol infused foam element of embodiment 909, wherein the beads are configured to break individually over a use life of the foam element due to being subject to pressure applied by a user of the foam element.
924. The cannabidiol infused foam element of embodiment 910, wherein the beads are configured to break individually over a use life of the foam element due to being subject to pressure applied by a user of the foam element.
925. The cannabidiol infused foam element of embodiment 911, wherein the beads are configured to break individually over a use life of the foam element due to being subject to pressure applied by a user of the foam element.
926. The cannabidiol infused foam element of embodiment 912, wherein the beads are configured to break individually over a use life of the foam element due to being subject to pressure applied by a user of the foam element.
927. The cannabidiol infused foam element of embodiment 913, wherein the beads are configured to break individually over a use life of the foam element due to being subject to pressure applied by a user of the foam element.
928. The cannabidiol infused foam element of embodiment 914, wherein the beads are configured to break individually over a use life of the foam element due to being subject to pressure applied by a user of the foam element.
929. The cannabidiol infused foam element of embodiment 915, wherein the beads are configured to break individually over a use life of the foam element due to being subject to pressure applied by a user of the foam element.
930. The cannabidiol infused foam element of embodiment 916, wherein the beads are configured to break individually over a use life of the foam element due to being subject to pressure applied by a user of the foam element.
931. The cannabidiol infused foam element of embodiment 917, wherein the beads are configured to not break over a use life of the foam element.
932. The cannabidiol infused foam element of embodiment 918, wherein the beads are configured to not break over a use life of the foam element.
933. The cannabidiol infused foam element of embodiment 919, wherein the beads are configured to not break over a use life of the foam element.
934. The cannabidiol infused foam element of embodiment 920, wherein the beads are configured to not break over a use life of the foam element.
935. The cannabidiol infused foam element of embodiment 921, wherein the beads are configured to not break over a use life of the foam element.
936. The cannabidiol infused foam element of embodiment 922, wherein the beads are configured to not break over a use life of the foam element.
937. The cannabidiol infused foam element of embodiment 923, wherein the beads are configured to not break over a use life of the foam element.
938. The cannabidiol infused foam element of embodiment 924, wherein the beads are configured to not break over a use life of the foam element.
939. The cannabidiol infused foam element of embodiment 925, wherein the beads are configured to not break over a use life of the foam element.

940. The cannabidiol infused foam element of embodiment 926, wherein the beads are configured to not break over a use life of the foam element.

941. The cannabidiol infused foam element of embodiment 927, wherein the beads are configured to not break over a use life of the foam element.

942. The cannabidiol infused foam element of embodiment 928, wherein the beads are configured to not break over a use life of the foam element.

943. The cannabidiol infused foam element of embodiment 929, wherein the beads are configured to not break over a use life of the foam element.

944. The cannabidiol infused foam element of any of embodiments 851 through 943, wherein the foam element comprises a mattress.

945. The cannabidiol infused foam element of embodiment 944, wherein the foam comprises polyurethane foam.

946. The cannabidiol infused foam element of embodiment 944, wherein the foam comprises viscoelastic polyurethane foam.

947. The cannabidiol infused foam element of embodiment 944, wherein the foam comprises latex foam.

948. The cannabidiol infused foam element of embodiment 944, wherein the foam comprises polyurethane foam, viscoelastic polyurethane foam, latex foam, or combinations thereof.

949. The cannabidiol infused foam element of any of embodiments 851 through 943, wherein the foam element comprises a pillow.

950. The cannabidiol infused foam element of embodiment 949, wherein the foam comprises polyurethane foam.

951. The cannabidiol infused foam element of embodiment 949, wherein the foam comprises viscoelastic polyurethane foam.

952. The cannabidiol infused foam element of embodiment 949, wherein the foam comprises latex foam.

953. The cannabidiol infused foam element of embodiment 949, wherein the foam comprises polyurethane foam, viscoelastic polyurethane foam, latex foam, or combinations thereof.

954. The cannabidiol infused foam element of any of embodiments 851 through 943, wherein the foam element comprises a seating surface.

955. The cannabidiol infused foam element of embodiment 954, wherein the foam comprises polyurethane foam.

956. The cannabidiol infused foam element of embodiment 954, wherein the foam comprises viscoelastic polyurethane foam.

957. The cannabidiol infused foam element of embodiment 954, wherein the foam comprises latex foam.

958. The cannabidiol infused foam element of embodiment 954, wherein the foam comprises polyurethane foam, viscoelastic polyurethane foam, latex foam, or combinations thereof.

959. The cannabidiol infused foam element of any of embodiments 851 through 943, wherein the foam element comprises a sleeping surface.

960. The cannabidiol infused foam element of embodiment 959, wherein the foam comprises polyurethane foam.

961. The cannabidiol infused foam element of embodiment 959, wherein the foam comprises viscoelastic polyurethane foam.

962. The cannabidiol infused foam element of embodiment 959, wherein the foam comprises latex foam.

963. The cannabidiol infused foam element of embodiment 959, wherein the foam comprises polyurethane foam, viscoelastic polyurethane foam, latex foam, or combinations thereof.

964. A method of making an oil infused foam element, the method comprising:

introducing oil to at least a portion of foam material to be used in the forming of the oil infused foam element.

965. The method of making the oil infused foam element of embodiment 964, wherein introducing the oil comprises combining the oil with the at least a portion of the foam material.

966. The method of making the oil infused foam element of embodiment 965, wherein introducing the oil comprises combining the oil into ingredients for making the at least a portion of the foam material.

967. The method of making the oil infused foam element of embodiment 964, wherein introducing the oil comprises injecting the oil into the at least a portion of the foam material during the formation of the oil infused foam element.

968. The method of making the oil infused foam element of embodiment 967, wherein the oil is contained in a gel.

969. The method of making the oil infused foam element of embodiment 968, wherein the gel is a polyurethane gel.

970. The method of making the oil infused foam element of embodiment 968, wherein the gel is a polymeric gel.

971. The method of making the oil infused foam element of embodiment 964, wherein introducing the oil comprises spraying the oil onto the at least a portion of the foam material during the formation of the oil infused foam element.

972. The method of making the oil infused foam element of embodiment 964, wherein introducing the oil comprises injecting the oil into the at least a portion of the foam material after the formation of the oil infused foam element.

973. The method of making the oil infused foam element of embodiment 964, wherein introducing the oil comprises spraying the oil onto the at least a portion of the foam material after the formation of the oil infused foam element 974. The method of making the oil infused foam element of embodiment 964, wherein introducing the oil comprises mixing beads, which encapsulate the oil, into ingredients of at least a portion of the foam material.

975. The method of making the oil infused foam element of embodiment 964, wherein introducing the oil comprises mixing beads, which encapsulate the oil, into at least a portion of the oil infused foam element.

976. The method of making the oil infused foam element of embodiment 974, wherein the beads are configured to break individually over a use life of the oil infused foam element.

977. The method of making the oil infused foam element of embodiment 974, wherein the beads are configured to not break over a use life of the oil infused foam element.

978. The method of making the oil infused foam element of embodiment 974, wherein a first set of beads are configured to break individually over a use life of the oil infused foam element and a second set of beads are configured to not break over the use life of the oil infused foam element.

979. The method of making the oil infused foam element of embodiment 964, wherein the foam material comprises polyurethane foam.
980. The method of making the oil infused foam element of embodiment 965, wherein the foam material comprises polyurethane foam.
981. The method of making the oil infused foam element of embodiment 966, wherein the foam material comprises polyurethane foam.
982. The method of making the oil infused foam element of embodiment 967, wherein the foam material comprises polyurethane foam.
983. The method of making the oil infused foam element of embodiment 968, wherein the foam material comprises polyurethane foam.
984. The method of making the oil infused foam element of embodiment 969, wherein the foam material comprises polyurethane foam.
985. The method of making the oil infused foam element of embodiment 970, wherein the foam material comprises polyurethane foam.
986. The method of making the oil infused foam element of embodiment 971, wherein the foam material comprises polyurethane foam.
987. The method of making the oil infused foam element of embodiment 972, wherein the foam material comprises polyurethane foam.
988. The method of making the oil infused foam element of embodiment 973, wherein the foam material comprises polyurethane foam.
989. The method of making the oil infused foam element of embodiment 974, wherein the foam material comprises polyurethane foam.
990. The method of making the oil infused foam element of embodiment 975, wherein the foam material comprises polyurethane foam.
991. The method of making the oil infused foam element of embodiment 976, wherein the foam material comprises polyurethane foam.
992. The method of making the oil infused foam element of embodiment 977, wherein the foam material comprises polyurethane foam.
993. The method of making the oil infused foam element of embodiment 978, wherein the foam material comprises polyurethane foam.
994. The method of making the oil infused foam element of embodiment 964, wherein the foam material comprises viscoelastic polyurethane foam.
995. The method of making the oil infused foam element of embodiment 965, wherein the foam material comprises viscoelastic polyurethane foam.
996. The method of making the oil infused foam element of embodiment 966, wherein the foam material comprises viscoelastic polyurethane foam.
997. The method of making the oil infused foam element of embodiment 967, wherein the foam material comprises viscoelastic polyurethane foam.
998. The method of making the oil infused foam element of embodiment 968, wherein the foam material comprises viscoelastic polyurethane foam.
999. The method of making the oil infused foam element of embodiment 969, wherein the foam material comprises viscoelastic polyurethane foam.
1000. The method of making the oil infused foam element of embodiment 970, wherein the foam material comprises viscoelastic polyurethane foam.
1001. The method of making the oil infused foam element of embodiment 971, wherein the foam material comprises viscoelastic polyurethane foam.
1002. The method of making the oil infused foam element of embodiment 972, wherein the foam material comprises viscoelastic polyurethane foam.
1003. The method of making the oil infused foam element of embodiment 973, wherein the foam material comprises viscoelastic polyurethane foam.
1004. The method of making the oil infused foam element of embodiment 974, wherein the foam material comprises viscoelastic polyurethane foam.
1005. The method of making the oil infused foam element of embodiment 975, wherein the foam material comprises viscoelastic polyurethane foam.
1006. The method of making the oil infused foam element of embodiment 976, wherein the foam material comprises viscoelastic polyurethane foam.
1007. The method of making the oil infused foam element of embodiment 977, wherein the foam material comprises viscoelastic polyurethane foam.
1008. The method of making the oil infused foam element of embodiment 978, wherein the foam material comprises viscoelastic polyurethane foam.
1009. The method of making the oil infused foam element of embodiment 964, wherein the foam material comprises latex foam.
1010. The method of making the oil infused foam element of embodiment 965, wherein the foam material comprises latex foam.
1011. The method of making the oil infused foam element of embodiment 966, wherein the foam material comprises latex foam.
1012. The method of making the oil infused foam element of embodiment 967, wherein the foam material comprises latex foam.
1013. The method of making the oil infused foam element of embodiment 968, wherein the foam material comprises latex foam.
1014. The method of making the oil infused foam element of embodiment 969, wherein the foam material comprises latex foam.
1015. The method of making the oil infused foam element of embodiment 970, wherein the foam material comprises latex foam.
1016. The method of making the oil infused foam element of embodiment 971, wherein the foam material comprises latex foam.
1017. The method of making the oil infused foam element of embodiment 972, wherein the foam material comprises latex foam.
1018. The method of making the oil infused foam element of embodiment 973, wherein the foam material comprises latex foam.
1019. The method of making the oil infused foam element of embodiment 974, wherein the foam material comprises latex foam.
1020. The method of making the oil infused foam element of embodiment 975, wherein the foam material comprises latex foam.
1021. The method of making the oil infused foam element of embodiment 976, wherein the foam material comprises latex foam.

1022. The method of making the oil infused foam element of embodiment 977, wherein the foam material comprises latex foam.
1023. The method of making the oil infused foam element of embodiment 978, wherein the foam material comprises latex foam.
1024. The method of making the oil infused foam element of embodiment 964, wherein the foam material comprises polyurethane foam, viscoelastic polyurethane foam, latex foam, or combinations thereof.
1025. The method of making the oil infused foam element of embodiment 965, wherein the foam material comprises polyurethane foam, viscoelastic polyurethane foam, latex foam, or combinations thereof.
1026. The method of making the oil infused foam element of embodiment 966, wherein the foam material comprises polyurethane foam, viscoelastic polyurethane foam, latex foam, or combinations thereof.
1027. The method of making the oil infused foam element of embodiment 967, wherein the foam material comprises polyurethane foam, viscoelastic polyurethane foam, latex foam, or combinations thereof.
1028. The method of making the oil infused foam element of embodiment 968, wherein the foam material comprises polyurethane foam, viscoelastic polyurethane foam, latex foam, or combinations thereof.
1029. The method of making the oil infused foam element of embodiment 969, wherein the foam material comprises polyurethane foam, viscoelastic polyurethane foam, latex foam, or combinations thereof.
1030. The method of making the oil infused foam element of embodiment 970, wherein the foam material comprises polyurethane foam, viscoelastic polyurethane foam, latex foam, or combinations thereof.
1031. The method of making the oil infused foam element of embodiment 971, wherein the foam material comprises polyurethane foam, viscoelastic polyurethane foam, latex foam, or combinations thereof.
1032. The method of making the oil infused foam element of embodiment 972, wherein the foam material comprises polyurethane foam, viscoelastic polyurethane foam, latex foam, or combinations thereof.
1033. The method of making the oil infused foam element of embodiment 973, wherein the foam material comprises polyurethane foam, viscoelastic polyurethane foam, latex foam, or combinations thereof.
1034. The method of making the oil infused foam element of embodiment 974, wherein the foam material comprises polyurethane foam, viscoelastic polyurethane foam, latex foam, or combinations thereof.
1035. The method of making the oil infused foam element of embodiment 975, wherein the foam material comprises polyurethane foam, viscoelastic polyurethane foam, latex foam, or combinations thereof.
1036. The method of making the oil infused foam element of embodiment 976, wherein the foam material comprises polyurethane foam, viscoelastic polyurethane foam, latex foam, or combinations thereof.
1037. The method of making the oil infused foam element of embodiment 977, wherein the foam material comprises polyurethane foam, viscoelastic polyurethane foam, latex foam, or combinations thereof.
1038. The method of making the oil infused foam element of embodiment 978, wherein the foam material comprises polyurethane foam, viscoelastic polyurethane foam, latex foam, or combinations thereof.
1039. The method making the oil infused foam element of any one of embodiments 964-1038, further comprising forming the oil infused foam element from a single layer of the foam material.
1040. The method making the oil infused foam element of embodiment 1039, further comprising forming a mattress from the oil infused foam element.
1041. The method making the oil infused foam element of embodiment 1039, further comprising forming a pillow from the oil infused foam element.
1042. The method making the oil infused foam element of embodiment 1039, further comprising forming a seating surface from the oil infused foam element.
1043. The method making the oil infused foam element of embodiment 1039, further comprising forming a sleeping surface from the oil infused foam element.
1044. The method making the oil infused foam element of any one of embodiments 964-1038, further comprising forming the oil infused foam element from a plurality of layers of the foam material.
1045. The method making the oil infused foam element of embodiment 1044, further comprising forming a mattress from the oil infused foam element.
1046. The method of making the oil infused foam element of embodiment 1045, wherein the plurality of layers of the mattress each comprise the oil.
1047. The method of making the oil infused foam element of embodiment 1044, wherein the at least one of the plurality of layers of the mattress does not comprise the oil.
1048. The method of making the oil infused foam element of embodiment 1047, wherein the at least one of the plurality of layers of the mattress which does not comprise the oil is a direct user contact layer.
1049. The method making the oil infused foam element of embodiment 1044, further comprising forming a pillow from the oil infused foam element.
1050. The method of making the oil infused foam element of embodiment 1049, wherein the plurality of layers of the pillow each comprise the oil.
1051. The method of making the oil infused foam element of embodiment 1049, wherein the at least one of the plurality of layers of the pillow does not comprise the oil.
1052. The method of making the oil infused foam element of embodiment 1051, wherein the at least one of the plurality of layers of the pillow which does not comprise the oil is a direct user contact layer.
1053. The method making the oil infused foam element of embodiment 1044, further comprising forming a seating surface from the oil infused foam element.
1054. The method of making the oil infused foam element of embodiment 1053, wherein the plurality of layers of the seating surface each comprise the oil.
1055. The method of making the oil infused foam element of embodiment 1053, wherein the at least one of the plurality of layers of the seating surface does not comprise the oil.
1056. The method of making the oil infused foam element of embodiment 1055, wherein the at least one of the plurality of layers of the seating surface which does not comprise the oil is a direct user contact layer.
1057. The method making the oil infused foam element of embodiment 1044, further comprising forming a sleeping surface from the oil infused foam element.

1058. The method of making the oil infused foam element of embodiment 1057, wherein the plurality of layers of the sleeping surface each comprise the oil.

1059. The method of making the oil infused foam element of embodiment 1057, wherein the at least one of the plurality of layers of the sleeping surface does not comprise the oil.

1060. The method of making the oil infused foam element of embodiment 1059, wherein the at least one of the plurality of layers of the sleeping surface which does not comprise the oil is a direct user contact layer.

1061. A method of making a cannabidiol infused foam element, the method comprising: introducing cannabidiol to at least a portion of foam material to be used in the forming of the cannabidiol infused foam element.

1062. The method of making the cannabidiol infused foam element of embodiment 1061, wherein the cannabidiol comprises an oil, a powder, a particle, or combinations thereof.

1063. The method of making the cannabidiol infused foam element of embodiment 1061, wherein introducing the cannabidiol comprises combining the cannabidiol with the at least a portion of the foam material.

1064. The method of making the cannabidiol infused foam element of embodiment 1062, wherein introducing the cannabidiol comprises combining the cannabidiol with the at least a portion of the foam material.

1065. The method of making the cannabidiol infused foam element of embodiment 1063, wherein introducing the cannabidiol comprises combining the cannabidiol into ingredients for making the at least a portion of the foam material.

1066. The method of making the cannabidiol infused foam element of embodiment 1064, wherein introducing the cannabidiol comprises combining the cannabidiol into ingredients for making the at least a portion of the foam material.

1067. The method of making the cannabidiol infused foam element of embodiment 1061, wherein introducing the cannabidiol comprises injecting the cannabidiol into the at least a portion of the foam material during the formation of the cannabidiol infused foam element.

1068. The method of making the cannabidiol infused foam element of embodiment 1062, wherein introducing the cannabidiol comprises injecting the cannabidiol into the at least a portion of the foam material during the formation of the cannabidiol infused foam element.

1069. The method of making the cannabidiol infused foam element of embodiment 1067, wherein the cannabidiol is contained in a gel.

1070. The method of making the cannabidiol infused foam element of embodiment 1069, wherein the gel is a polyurethane gel.

1071. The method of making the cannabidiol infused foam element of embodiment 1070, wherein the gel is a polymeric gel.

1072. The method of making the cannabidiol infused foam element of embodiment 1068, wherein the cannabidiol is contained in a gel.

1073. The method of making the cannabidiol infused foam element of embodiment 1072, wherein the gel is a polyurethane gel.

1074. The method of making the cannabidiol infused foam element of embodiment 1073, wherein the gel is a polymeric gel.

1075. The method of making the cannabidiol infused foam element of embodiment 1061, wherein introducing the cannabidiol comprises spraying the cannabidiol onto the at least a portion of the foam material during the formation of the cannabidiol infused foam element.

1076. The method of making the cannabidiol infused foam element of embodiment 1062, wherein introducing the cannabidiol comprises spraying the cannabidiol onto the at least a portion of the foam material during the formation of the cannabidiol infused foam element.

1077. The method of making the cannabidiol infused foam element of embodiment 1061, wherein introducing the cannabidiol comprises injecting the cannabidiol into the at least a portion of the foam material after the formation of the cannabidiol infused foam element.

1078. The method of making the cannabidiol infused foam element of embodiment 1062, wherein introducing the cannabidiol comprises injecting the cannabidiol into the at least a portion of the foam material after the formation of the cannabidiol infused foam element.

1079. The method of making the cannabidiol infused foam element of embodiment 1061, wherein introducing the cannabidiol comprises spraying the cannabidiol onto the at least a portion of the foam material after the formation of the cannabidiol infused foam element 1080. The method of making the cannabidiol infused foam element of embodiment 1062, wherein introducing the cannabidiol comprises spraying the cannabidiol onto the at least a portion of the foam material after the formation of the cannabidiol infused foam element 1081. The method of making the cannabidiol infused foam element of embodiment 1061, wherein introducing the cannabidiol comprises mixing beads, which encapsulate the cannabidiol, into ingredients of at least a portion of the foam material.

1082. The method of making the cannabidiol infused foam element of embodiment 1062, wherein introducing the cannabidiol comprises mixing beads, which encapsulate the cannabidiol, into ingredients of at least a portion of the foam material.

1083. The method of making the cannabidiol infused foam element of embodiment 1061, wherein introducing the cannabidiol comprises mixing beads, which encapsulate the cannabidiol, into at least a portion of the cannabidiol infused foam element.

1084. The method of making the cannabidiol infused foam element of embodiment 1062, wherein introducing the cannabidiol comprises mixing beads, which encapsulate the cannabidiol, into at least a portion of the cannabidiol infused foam element.

1085. The method of making the cannabidiol infused foam element of embodiment 1081, wherein the beads are configured to break individually over a use life of the cannabidiol infused foam element.

1086. The method of making the cannabidiol infused foam element of embodiment 1081, wherein the beads are configured to not break over a use life of the cannabidiol infused foam element.

1087. The method of making the cannabidiol infused foam element of embodiment 1081, wherein a first set of beads are configured to break individually over a use life of the cannabidiol infused foam element and a second set of beads are configured to not break over the use life of the cannabidiol infused foam element.

1088. The method of making the cannabidiol infused foam element of embodiment 1082, wherein the beads are configured to break individually over a use life of the cannabidiol infused foam element.

1089. The method of making the cannabidiol infused foam element of embodiment 1082, wherein the beads are configured to not break over a use life of the cannabidiol infused foam element.

1090. The method of making the cannabidiol infused foam element of embodiment 1082, wherein a first set of beads are configured to break individually over a use life of the cannabidiol infused foam element and a second set of beads are configured to not break over the use life of the cannabidiol infused foam element.

1091. The method of making the cannabidiol infused foam element of embodiment 1061, wherein the foam material comprises polyurethane foam.

1092. The method of making the cannabidiol infused foam element of embodiment 1062, wherein the foam material comprises polyurethane foam.

1093. The method of making the cannabidiol infused foam element of embodiment 1063, wherein the foam material comprises polyurethane foam.

1094. The method of making the cannabidiol infused foam element of embodiment 1064, wherein the foam material comprises polyurethane foam.

1095. The method of making the cannabidiol infused foam element of embodiment 1065, wherein the foam material comprises polyurethane foam.

1096. The method of making the cannabidiol infused foam element of embodiment 1066, wherein the foam material comprises polyurethane foam.

1097. The method of making the cannabidiol infused foam element of embodiment 1067, wherein the foam material comprises polyurethane foam.

1098. The method of making the cannabidiol infused foam element of embodiment 1068, wherein the foam material comprises polyurethane foam.

1099. The method of making the cannabidiol infused foam element of embodiment 1069, wherein the foam material comprises polyurethane foam.

1100. The method of making the cannabidiol infused foam element of embodiment 1070, wherein the foam material comprises polyurethane foam.

1101. The method of making the cannabidiol infused foam element of embodiment 1071, wherein the foam material comprises polyurethane foam.

1102. The method of making the cannabidiol infused foam element of embodiment 1072, wherein the foam material comprises polyurethane foam.

1103. The method of making the cannabidiol infused foam element of embodiment 1073, wherein the foam material comprises polyurethane foam.

1104. The method of making the cannabidiol infused foam element of embodiment 1074, wherein the foam material comprises polyurethane foam.

1105. The method of making the cannabidiol infused foam element of embodiment 1075, wherein the foam material comprises polyurethane foam.

1106. The method of making the cannabidiol infused foam element of embodiment 1076, wherein the foam material comprises polyurethane foam.

1107. The method of making the cannabidiol infused foam element of embodiment 1077, wherein the foam material comprises polyurethane foam.

1108. The method of making the cannabidiol infused foam element of embodiment 1078, wherein the foam material comprises polyurethane foam.

1109. The method of making the cannabidiol infused foam element of embodiment 1079, wherein the foam material comprises polyurethane foam.

1110. The method of making the cannabidiol infused foam element of embodiment 1080, wherein the foam material comprises polyurethane foam.

1111. The method of making the cannabidiol infused foam element of embodiment 1081, wherein the foam material comprises polyurethane foam.

1112. The method of making the cannabidiol infused foam element of embodiment 1082, wherein the foam material comprises polyurethane foam.

1113. The method of making the cannabidiol infused foam element of embodiment 1083, wherein the foam material comprises polyurethane foam.

1114. The method of making the cannabidiol infused foam element of embodiment 1084, wherein the foam material comprises polyurethane foam.

1115. The method of making the cannabidiol infused foam element of embodiment 1085, wherein the foam material comprises polyurethane foam.

1116. The method of making the cannabidiol infused foam element of embodiment 1086, wherein the foam material comprises polyurethane foam.

1117. The method of making the cannabidiol infused foam element of embodiment 1087, wherein the foam material comprises polyurethane foam.

1118. The method of making the cannabidiol infused foam element of embodiment 1088, wherein the foam material comprises polyurethane foam.

1119. The method of making the cannabidiol infused foam element of embodiment 1089, wherein the foam material comprises polyurethane foam.

1120. The method of making the cannabidiol infused foam element of embodiment 1090, wherein the foam material comprises polyurethane foam.

1121. The method of making the cannabidiol infused foam element of embodiment 1061, wherein the foam material comprises viscoelastic polyurethane foam.

1122. The method of making the cannabidiol infused foam element of embodiment 1062, wherein the foam material comprises viscoelastic polyurethane foam.

1123. The method of making the cannabidiol infused foam element of embodiment 1063, wherein the foam material comprises viscoelastic polyurethane foam.

1124. The method of making the cannabidiol infused foam element of embodiment 1064, wherein the foam material comprises viscoelastic polyurethane foam.

1125. The method of making the cannabidiol infused foam element of embodiment 1065, wherein the foam material comprises viscoelastic polyurethane foam.

1126. The method of making the cannabidiol infused foam element of embodiment 1066, wherein the foam material comprises viscoelastic polyurethane foam.

1127. The method of making the cannabidiol infused foam element of embodiment 1067, wherein the foam material comprises viscoelastic polyurethane foam.

1128. The method of making the cannabidiol infused foam element of embodiment 1068, wherein the foam material comprises viscoelastic polyurethane foam.

1129. The method of making the cannabidiol infused foam element of embodiment 1069, wherein the foam material comprises viscoelastic polyurethane foam.

1130. The method of making the cannabidiol infused foam element of embodiment 1070, wherein the foam material comprises viscoelastic polyurethane foam.

1131. The method of making the cannabidiol infused foam element of embodiment 1071, wherein the foam material comprises viscoelastic polyurethane foam.

1132. The method of making the cannabidiol infused foam element of embodiment 1072, wherein the foam material comprises viscoelastic polyurethane foam.
1133. The method of making the cannabidiol infused foam element of embodiment 1073, wherein the foam material comprises viscoelastic polyurethane foam.
1134. The method of making the cannabidiol infused foam element of embodiment 1074, wherein the foam material comprises viscoelastic polyurethane foam.
1135. The method of making the cannabidiol infused foam element of embodiment 1075, wherein the foam material comprises viscoelastic polyurethane foam.
1136. The method of making the cannabidiol infused foam element of embodiment 1076, wherein the foam material comprises viscoelastic polyurethane foam.
1137. The method of making the cannabidiol infused foam element of embodiment 1077, wherein the foam material comprises viscoelastic polyurethane foam.
1138. The method of making the cannabidiol infused foam element of embodiment 1078, wherein the foam material comprises viscoelastic polyurethane foam.
1139. The method of making the cannabidiol infused foam element of embodiment 1079, wherein the foam material comprises viscoelastic polyurethane foam.
1140. The method of making the cannabidiol infused foam element of embodiment 1080, wherein the foam material comprises viscoelastic polyurethane foam.
1141. The method of making the cannabidiol infused foam element of embodiment 1081, wherein the foam material comprises viscoelastic polyurethane foam.
1142. The method of making the cannabidiol infused foam element of embodiment 1082, wherein the foam material comprises viscoelastic polyurethane foam.
1143. The method of making the cannabidiol infused foam element of embodiment 1083, wherein the foam material comprises viscoelastic polyurethane foam.
1144. The method of making the cannabidiol infused foam element of embodiment 1084, wherein the foam material comprises viscoelastic polyurethane foam.
1145. The method of making the cannabidiol infused foam element of embodiment 1085, wherein the foam material comprises viscoelastic polyurethane foam.
1146. The method of making the cannabidiol infused foam element of embodiment 1086, wherein the foam material comprises viscoelastic polyurethane foam.
1147. The method of making the cannabidiol infused foam element of embodiment 1087, wherein the foam material comprises viscoelastic polyurethane foam.
1148. The method of making the cannabidiol infused foam element of embodiment 1088, wherein the foam material comprises viscoelastic polyurethane foam.
1149. The method of making the cannabidiol infused foam element of embodiment 1089, wherein the foam material comprises viscoelastic polyurethane foam.
1150. The method of making the cannabidiol infused foam element of embodiment 1090, wherein the foam material comprises viscoelastic polyurethane foam.
1151. The method of making the cannabidiol infused foam element of embodiment 1061, wherein the foam material comprises latex foam.
1152. The method of making the cannabidiol infused foam element of embodiment 1062, wherein the foam material comprises latex foam.
1153. The method of making the cannabidiol infused foam element of embodiment 1063, wherein the foam material comprises latex foam.
1154. The method of making the cannabidiol infused foam element of embodiment 1064, wherein the foam material comprises latex foam.
1155. The method of making the cannabidiol infused foam element of embodiment 1065, wherein the foam material comprises latex foam.
1156. The method of making the cannabidiol infused foam element of embodiment 1066, wherein the foam material comprises latex foam.
1157. The method of making the cannabidiol infused foam element of embodiment 1067, wherein the foam material comprises latex foam.
1158. The method of making the cannabidiol infused foam element of embodiment 1068, wherein the foam material comprises latex foam.
1159. The method of making the cannabidiol infused foam element of embodiment 1069, wherein the foam material comprises latex foam.
1160. The method of making the cannabidiol infused foam element of embodiment 1070, wherein the foam material comprises latex foam.
1161. The method of making the cannabidiol infused foam element of embodiment 1071, wherein the foam material comprises latex foam.
1162. The method of making the cannabidiol infused foam element of embodiment 1072, wherein the foam material comprises latex foam.
1163. The method of making the cannabidiol infused foam element of embodiment 1073, wherein the foam material comprises latex foam.
1164. The method of making the cannabidiol infused foam element of embodiment 1074, wherein the foam material comprises latex foam.
1165. The method of making the cannabidiol infused foam element of embodiment 1075, wherein the foam material comprises latex foam.
1166. The method of making the cannabidiol infused foam element of embodiment 1076, wherein the foam material comprises latex foam.
1167. The method of making the cannabidiol infused foam element of embodiment 1077, wherein the foam material comprises latex foam.
1168. The method of making the cannabidiol infused foam element of embodiment 1078, wherein the foam material comprises latex foam.
1169. The method of making the cannabidiol infused foam element of embodiment 1079, wherein the foam material comprises latex foam.
1170. The method of making the cannabidiol infused foam element of embodiment 1080, wherein the foam material comprises latex foam.
1171. The method of making the cannabidiol infused foam element of embodiment 1081, wherein the foam material comprises latex foam.
1172. The method of making the cannabidiol infused foam element of embodiment 1082, wherein the foam material comprises latex foam.
1173. The method of making the cannabidiol infused foam element of embodiment 1083, wherein the foam material comprises latex foam.
1174. The method of making the cannabidiol infused foam element of embodiment 1084, wherein the foam material comprises latex foam.
1175. The method of making the cannabidiol infused foam element of embodiment 1085, wherein the foam material comprises latex foam.

1176. The method of making the cannabidiol infused foam element of embodiment 1086, wherein the foam material comprises latex foam.

1177. The method of making the cannabidiol infused foam element of embodiment 1087, wherein the foam material comprises latex foam.

1178. The method of making the cannabidiol infused foam element of embodiment 1088, wherein the foam material comprises latex foam.

1179. The method of making the cannabidiol infused foam element of embodiment 1089, wherein the foam material comprises latex foam.

1180. The method of making the cannabidiol infused foam element of embodiment 1090, wherein the foam material comprises latex foam.

1181. The method of making the cannabidiol infused foam element of embodiment 1061, wherein the foam material comprises polyurethane foam, viscoelastic polyurethane foam, latex foam, or combinations thereof.

1182. The method of making the cannabidiol infused foam element of embodiment 1062, wherein the foam material comprises polyurethane foam, viscoelastic polyurethane foam, latex foam, or combinations thereof.

1183. The method of making the cannabidiol infused foam element of embodiment 1063, wherein the foam material comprises polyurethane foam, viscoelastic polyurethane foam, latex foam, or combinations thereof.

1184. The method of making the cannabidiol infused foam element of embodiment 1064, wherein the foam material comprises polyurethane foam, viscoelastic polyurethane foam, latex foam, or combinations thereof.

1185. The method of making the cannabidiol infused foam element of embodiment 1065, wherein the foam material comprises polyurethane foam, viscoelastic polyurethane foam, latex foam, or combinations thereof.

1186. The method of making the cannabidiol infused foam element of embodiment 1066, wherein the foam material comprises polyurethane foam, viscoelastic polyurethane foam, latex foam, or combinations thereof.

1187. The method of making the cannabidiol infused foam element of embodiment 1067, wherein the foam material comprises polyurethane foam, viscoelastic polyurethane foam, latex foam, or combinations thereof.

1188. The method of making the cannabidiol infused foam element of embodiment 1068, wherein the foam material comprises polyurethane foam, viscoelastic polyurethane foam, latex foam, or combinations thereof.

1189. The method of making the cannabidiol infused foam element of embodiment 1069, wherein the foam material comprises polyurethane foam, viscoelastic polyurethane foam, latex foam, or combinations thereof.

1190. The method of making the cannabidiol infused foam element of embodiment 1070, wherein the foam material comprises polyurethane foam, viscoelastic polyurethane foam, latex foam, or combinations thereof.

1191. The method of making the cannabidiol infused foam element of embodiment 1071, wherein the foam material comprises polyurethane foam, viscoelastic polyurethane foam, latex foam, or combinations thereof.

1192. The method of making the cannabidiol infused foam element of embodiment 1072, wherein the foam material comprises polyurethane foam, viscoelastic polyurethane foam, latex foam, or combinations thereof.

1193. The method of making the cannabidiol infused foam element of embodiment 1073, wherein the foam material comprises polyurethane foam, viscoelastic polyurethane foam, latex foam, or combinations thereof.

1194. The method of making the cannabidiol infused foam element of embodiment 1074, wherein the foam material comprises polyurethane foam, viscoelastic polyurethane foam, latex foam, or combinations thereof.

1195. The method of making the cannabidiol infused foam element of embodiment 1075, wherein the foam material comprises polyurethane foam, viscoelastic polyurethane foam, latex foam, or combinations thereof.

1196. The method of making the cannabidiol infused foam element of embodiment 1076, wherein the foam material comprises polyurethane foam, viscoelastic polyurethane foam, latex foam, or combinations thereof.

1197. The method of making the cannabidiol infused foam element of embodiment 1077, wherein the foam material comprises polyurethane foam, viscoelastic polyurethane foam, latex foam, or combinations thereof.

1198. The method of making the cannabidiol infused foam element of embodiment 1078, wherein the foam material comprises polyurethane foam, viscoelastic polyurethane foam, latex foam, or combinations thereof.

1199. The method of making the cannabidiol infused foam element of embodiment 1079, wherein the foam material comprises polyurethane foam, viscoelastic polyurethane foam, latex foam, or combinations thereof.

1200. The method of making the cannabidiol infused foam element of embodiment 1080, wherein the foam material comprises polyurethane foam, viscoelastic polyurethane foam, latex foam, or combinations thereof.

1201. The method of making the cannabidiol infused foam element of embodiment 1081, wherein the foam material comprises polyurethane foam, viscoelastic polyurethane foam, latex foam, or combinations thereof.

1202. The method of making the cannabidiol infused foam element of embodiment 1082, wherein the foam material comprises polyurethane foam, viscoelastic polyurethane foam, latex foam, or combinations thereof.

1203. The method of making the cannabidiol infused foam element of embodiment 1083, wherein the foam material comprises polyurethane foam, viscoelastic polyurethane foam, latex foam, or combinations thereof.

1204. The method of making the cannabidiol infused foam element of embodiment 1084, wherein the foam material comprises polyurethane foam, viscoelastic polyurethane foam, latex foam, or combinations thereof.
1205. The method of making the cannabidiol infused foam element of embodiment 1085, wherein the foam material comprises polyurethane foam, viscoelastic polyurethane foam, latex foam, or combinations thereof.
1206. The method of making the cannabidiol infused foam element of embodiment 1086, wherein the foam material comprises polyurethane foam, viscoelastic polyurethane foam, latex foam, or combinations thereof.
1207. The method of making the cannabidiol infused foam element of embodiment 1087, wherein the foam material comprises polyurethane foam, viscoelastic polyurethane foam, latex foam, or combinations thereof.
1208. The method of making the cannabidiol infused foam element of embodiment 1088, wherein the foam material comprises polyurethane foam, viscoelastic polyurethane foam, latex foam, or combinations thereof.
1209. The method of making the cannabidiol infused foam element of embodiment 1089, wherein the foam material comprises polyurethane foam, viscoelastic polyurethane foam, latex foam, or combinations thereof.
1210. The method of making the cannabidiol infused foam element of embodiment 1090, wherein the foam material comprises polyurethane foam, viscoelastic polyurethane foam, latex foam, or combinations thereof.
1211. The method making the cannabidiol infused foam element of any one of embodiments 1061-1210, further comprising forming the cannabidiol infused foam element from a single layer of the foam material.
1212. The method making the cannabidiol infused foam element of embodiment 1211, further comprising forming a mattress from the cannabidiol infused foam element.
1213. The method making the cannabidiol infused foam element of embodiment 1211, further comprising forming a pillow from the cannabidiol infused foam element.
1214. The method making the cannabidiol infused foam element of embodiment 1211, further comprising forming a seating surface from the cannabidiol infused foam element.
1215. The method making the cannabidiol infused foam element of embodiment 1211, further comprising forming a sleeping surface from the cannabidiol infused foam element.
1216. The method making the cannabidiol infused foam element of any one of embodiments 1061-1210, further comprising forming the cannabidiol infused foam element from a plurality of layers of the foam material.
1217. The method making the cannabidiol infused foam element of embodiment 1216, further comprising forming a mattress from the cannabidiol infused foam element.
1218. The method of making the cannabidiol infused foam element of embodiment 1217, wherein the plurality of layers of the mattress each comprise the cannabidiol.
1219. The method of making the cannabidiol infused foam element of embodiment 1217, wherein the at least one of the plurality of layers of the mattress does not comprise the cannabidiol.
1220. The method of making the cannabidiol infused foam element of embodiment 1219, wherein the at least one of the plurality of layers of the mattress which does not comprise the cannabidiol is a direct user contact layer.
1221. The method making the cannabidiol infused foam element of embodiment 1216, further comprising forming a pillow from the cannabidiol infused foam element.
1222. The method of making the cannabidiol infused foam element of embodiment 1221, wherein the plurality of layers of the pillow each comprise the cannabidiol.
1223. The method of making the cannabidiol infused foam element of embodiment 1221, wherein the at least one of the plurality of layers of the pillow does not comprise the cannabidiol.
1224. The method of making the cannabidiol infused foam element of embodiment 1223, wherein the at least one of the plurality of layers of the pillow which does not comprise the cannabidiol is a direct user contact layer.
1225. The method making the cannabidiol infused foam element of embodiment 1216, further comprising forming a seating surface from the cannabidiol infused foam element.
1226. The method of making the cannabidiol infused foam element of embodiment 1225, wherein the plurality of layers of the seating surface each comprise the cannabidiol.
1227. The method of making the cannabidiol infused foam element of embodiment 1225, wherein the at least one of the plurality of layers of the seating surface does not comprise the cannabidiol.
1228. The method of making the cannabidiol infused foam element of embodiment 1227, wherein the at least one of the plurality of layers of the seating surface which does not comprise the cannabidiol is a direct user contact layer.
1229. The method making the cannabidiol infused foam element of embodiment 1216, further comprising forming a sleeping surface from the cannabidiol infused foam element.
1230. The method of making the cannabidiol infused foam element of embodiment 1229, wherein the plurality of layers of the sleeping surface each comprise the cannabidiol.
1231. The method of making the cannabidiol infused foam element of embodiment 1229, wherein the at least one of the plurality of layers of the sleeping surface does not comprise the cannabidiol.
1232. The method of making the cannabidiol infused foam element of embodiment 1231, wherein the at least one of the plurality of layers of the sleeping surface which does not comprise the cannabidiol is a direct user contact layer.
1233. The method making the cannabidiol infused foam element of any one of embodiments 1062, 1064, 1066, 1068, 1072, 1073, 1074, 1076, 1078, 1080, 1082, 1084, 1088, 1089, 1090, 1092, 1094, 1096, 1098, 1102, 1103, 1104, 1106, 1108, 1112, 1114, 1118, 1119, 1120, 1122, 1124, 1126, 1128, 1132, 1133, 1134, 1136, 1138, 1140, 1142, 1144, 1148, 1149, 1150, 1152, 1154, 1156, 1158, 1162, 1163, 1164, 1166, 1168, 1170, 1172, 1174, 1178, 1180, 1182, 1184, 1186, 1188, 1192, 1193, 1194, 1196, 1198, 1200, 1202, 1204, 1208, 1209, or 1210, further comprising forming the cannabidiol infused foam element from a plurality of layers of the foam material.

1234. The method making the cannabidiol infused foam element of embodiment 1233, further comprising forming a mattress from the cannabidiol infused foam element.

1235. The method of making the cannabidiol infused foam element of embodiment 1234, wherein the plurality of layers of the mattress each comprise the cannabidiol.

1236. The method of making the cannabidiol infused foam element of embodiment 1235, wherein each of the plurality of layers of the mattress comprise cannabidiol oil, cannabidiol powder, cannabidiol particle, or combinations thereof.

1237. The method of making the cannabidiol infused foam element of embodiment 1235, wherein each of the plurality of layers of the mattress only comprise cannabidiol oil.

1238. The method of making the cannabidiol infused foam element of embodiment 1235, wherein each of the plurality of layers of the mattress only comprise cannabidiol powder.

1239. The method of making the cannabidiol infused foam element of embodiment 1235, wherein each of the plurality of layers of the mattress only comprise cannabidiol particle.

1240. The method of making the cannabidiol infused foam element of embodiment 1235, wherein at least one of the plurality of layers of the mattress comprises a form of cannabidiol which differs from those of a remainder of the plurality of layers.

1241. The method of making the cannabidiol infused foam element of embodiment 1234, wherein the at least one of the plurality of layers of the mattress does not comprise the cannabidiol.

1242. The method of making the cannabidiol infused foam element of embodiment 1241, wherein each of the plurality of layers of the mattress which comprise cannabidiol, comprise cannabidiol oil, cannabidiol powder, cannabidiol particle, or combinations thereof.

1243. The method of making the cannabidiol infused foam element of embodiment 1241, wherein each of the plurality of layers of the mattress which comprise cannabidiol, only comprise cannabidiol oil.

1244. The method of making the cannabidiol infused foam element of embodiment 1241, wherein each of the plurality of layers of the mattress which comprise cannabidiol, only comprise cannabidiol powder.

1245. The method of making the cannabidiol infused foam element of embodiment 1241, wherein each of the plurality of layers of the mattress which comprise cannabidiol, only comprise cannabidiol particle.

1246. The method of making the cannabidiol infused foam element of embodiment 1241, wherein at least one of the plurality of layers of the mattress which comprise cannabidiol, comprises a form of cannabidiol which differs from those of a remainder of the plurality of layers which comprise cannabidiol.

1247. The method of making the cannabidiol infused foam element of embodiment 1241, wherein the at least one of the plurality of layers of the mattress which does not comprise the cannabidiol is a direct user contact layer.

1248. The method of making the cannabidiol infused foam element of embodiment 1242, wherein the at least one of the plurality of layers of the mattress which does not comprise the cannabidiol is a direct user contact layer.

1249. The method of making the cannabidiol infused foam element of embodiment 1243, wherein the at least one of the plurality of layers of the mattress which does not comprise the cannabidiol is a direct user contact layer.

1250. The method of making the cannabidiol infused foam element of embodiment 1244, wherein the at least one of the plurality of layers of the mattress which does not comprise the cannabidiol is a direct user contact layer.

1251. The method of making the cannabidiol infused foam element of embodiment 1245, wherein the at least one of the plurality of layers of the mattress which does not comprise the cannabidiol is a direct user contact layer.

1252. The method of making the cannabidiol infused foam element of embodiment 1246, wherein the at least one of the plurality of layers of the mattress which does not comprise the cannabidiol is a direct user contact layer.

1253. The method making the cannabidiol infused foam element of embodiment 1233, further comprising forming a pillow from the cannabidiol infused foam element.

1254. The method of making the cannabidiol infused foam element of embodiment 1253, wherein the plurality of layers of the pillow each comprise the cannabidiol.

1255. The method of making the cannabidiol infused foam element of embodiment 1254, wherein each of the plurality of layers of the pillow comprise cannabidiol oil, cannabidiol powder, cannabidiol particle, or combinations thereof.

1256. The method of making the cannabidiol infused foam element of embodiment 1254, wherein each of the plurality of layers of the pillow only comprise cannabidiol oil.

1257. The method of making the cannabidiol infused foam element of embodiment 1254, wherein each of the plurality of layers of the pillow only comprise cannabidiol powder.

1258. The method of making the cannabidiol infused foam element of embodiment 1254, wherein each of the plurality of layers of the pillow only comprise cannabidiol particle.

1259. The method of making the cannabidiol infused foam element of embodiment 1254, wherein at least one of the plurality of layers of the pillow comprises a form of cannabidiol which differs from those of a remainder of the plurality of layers.

1260. The method of making the cannabidiol infused foam element of embodiment 1253, wherein the at least one of the plurality of layers of the pillow does not comprise the cannabidiol.

1261. The method of making the cannabidiol infused foam element of embodiment 1260, wherein each of the plurality of layers of the pillow which comprise cannabidiol, comprise cannabidiol oil, cannabidiol powder, cannabidiol particle, or combinations thereof.

1262. The method of making the cannabidiol infused foam element of embodiment 1260, wherein each of the plurality of layers of the pillow which comprise cannabidiol, only comprise cannabidiol oil.
1263. The method of making the cannabidiol infused foam element of embodiment 1260, wherein each of the plurality of layers of the pillow which comprise cannabidiol, only comprise cannabidiol powder.
1264. The method of making the cannabidiol infused foam element of embodiment 1260, wherein each of the plurality of layers of the pillow which comprise cannabidiol, only comprise cannabidiol particle.
1265. The method of making the cannabidiol infused foam element of embodiment 1260, wherein at least one of the plurality of layers of the pillow which comprise cannabidiol, comprises a form of cannabidiol which differs from those of a remainder of the plurality of layers which comprise cannabidiol.
1266. The method of making the cannabidiol infused foam element of embodiment 1260, wherein the at least one of the plurality of layers of the pillow which does not comprise the cannabidiol is a direct user contact layer.
1267. The method of making the cannabidiol infused foam element of embodiment 1261, wherein the at least one of the plurality of layers of the pillow which does not comprise the cannabidiol is a direct user contact layer.
1268. The method of making the cannabidiol infused foam element of embodiment 1262, wherein the at least one of the plurality of layers of the pillow which does not comprise the cannabidiol is a direct user contact layer.
1269. The method of making the cannabidiol infused foam element of embodiment 1263, wherein the at least one of the plurality of layers of the pillow which does not comprise the cannabidiol is a direct user contact layer.
1270. The method of making the cannabidiol infused foam element of embodiment 1264, wherein the at least one of the plurality of layers of the pillow which does not comprise the cannabidiol is a direct user contact layer.
1271. The method of making the cannabidiol infused foam element of embodiment 1265, wherein the at least one of the plurality of layers of the pillow which does not comprise the cannabidiol is a direct user contact layer.
1272. The method making the cannabidiol infused foam element of embodiment 1233, further comprising forming a seating surface from the cannabidiol infused foam element.
1273. The method of making the cannabidiol infused foam element of embodiment 1272, wherein the plurality of layers of the seating surface each comprise the cannabidiol.
1274. The method of making the cannabidiol infused foam element of embodiment 1273, wherein each of the plurality of layers of the seating surface comprise cannabidiol oil, cannabidiol powder, cannabidiol particle, or combinations thereof.
1275. The method of making the cannabidiol infused foam element of embodiment 1273, wherein each of the plurality of layers of the seating surface only comprise cannabidiol oil.
1276. The method of making the cannabidiol infused foam element of embodiment 1273, wherein each of the plurality of layers of the seating surface only comprise cannabidiol powder.
1277. The method of making the cannabidiol infused foam element of embodiment 1273, wherein each of the plurality of layers of the seating surface only comprise cannabidiol particle.
1278. The method of making the cannabidiol infused foam element of embodiment 1273, wherein at least one of the plurality of layers of the seating surface comprises a form of cannabidiol which differs from those of a remainder of the plurality of layers.
1279. The method of making the cannabidiol infused foam element of embodiment 1272, wherein the at least one of the plurality of layers of the seating surface does not comprise the cannabidiol.
1280. The method of making the cannabidiol infused foam element of embodiment 1279, wherein each of the plurality of layers of the seating surface which comprise cannabidiol, comprise cannabidiol oil, cannabidiol powder, cannabidiol particle, or combinations thereof.
1281. The method of making the cannabidiol infused foam element of embodiment 1279, wherein each of the plurality of layers of the seating surface which comprise cannabidiol, only comprise cannabidiol oil.
1282. The method of making the cannabidiol infused foam element of embodiment 1279, wherein each of the plurality of layers of the seating surface which comprise cannabidiol, only comprise cannabidiol powder.
1283. The method of making the cannabidiol infused foam element of embodiment 1279, wherein each of the plurality of layers of the seating surface which comprise cannabidiol, only comprise cannabidiol particle.
1284. The method of making the cannabidiol infused foam element of embodiment 1279, wherein at least one of the plurality of layers of the seating surface which comprise cannabidiol, comprises a form of cannabidiol which differs from those of a remainder of the plurality of layers which comprise cannabidiol.
1285. The method of making the cannabidiol infused foam element of embodiment 1279, wherein the at least one of the plurality of layers of the seating surface which does not comprise the cannabidiol is a direct user contact layer.
1286. The method of making the cannabidiol infused foam element of embodiment 1280, wherein the at least one of the plurality of layers of the seating surface which does not comprise the cannabidiol is a direct user contact layer.
1287. The method of making the cannabidiol infused foam element of embodiment 1281, wherein the at least one of the plurality of layers of the seating surface which does not comprise the cannabidiol is a direct user contact layer.
1288. The method of making the cannabidiol infused foam element of embodiment 1282, wherein the at least one of the plurality of layers of the seating surface which does not comprise the cannabidiol is a direct user contact layer.
1289. The method of making the cannabidiol infused foam element of embodiment 1283, wherein the at least one of the plurality of layers of the seating surface which does not comprise the cannabidiol is a direct user contact layer.
1290. The method of making the cannabidiol infused foam element of embodiment 1284, wherein the at least one of the plurality of layers of the seating surface which does not comprise the cannabidiol is a direct user contact layer.

1291. The method making the cannabidiol infused foam element of embodiment 1233, further comprising forming a sleeping surface from the cannabidiol infused foam element.

1292. The method of making the cannabidiol infused foam element of embodiment 1291, wherein the plurality of layers of the sleeping surface each comprise the cannabidiol.

1293. The method of making the cannabidiol infused foam element of embodiment 1292, wherein each of the plurality of layers of the sleeping surface comprise cannabidiol oil, cannabidiol powder, cannabidiol particle, or combinations thereof.

1294. The method of making the cannabidiol infused foam element of embodiment 1292, wherein each of the plurality of layers of the sleeping surface only comprise cannabidiol oil.

1295. The method of making the cannabidiol infused foam element of embodiment 1292, wherein each of the plurality of layers of the sleeping surface only comprise cannabidiol powder.

1296. The method of making the cannabidiol infused foam element of embodiment 1292, wherein each of the plurality of layers of the sleeping surface only comprise cannabidiol particle.

1297. The method of making the cannabidiol infused foam element of embodiment 1292, wherein at least one of the plurality of layers of the sleeping surface comprises a form of cannabidiol which differs from those of a remainder of the plurality of layers.

1298. The method of making the cannabidiol infused foam element of embodiment 1291, wherein the at least one of the plurality of layers of the sleeping surface does not comprise the cannabidiol.

1299. The method of making the cannabidiol infused foam element of embodiment 1201, wherein each of the plurality of layers of the sleeping surface which comprise cannabidiol, comprise cannabidiol oil, cannabidiol powder, cannabidiol particle, or combinations thereof.

1300. The method of making the cannabidiol infused foam element of embodiment 1298, wherein each of the plurality of layers of the sleeping surface which comprise cannabidiol, only comprise cannabidiol oil.

1301. The method of making the cannabidiol infused foam element of embodiment 1298, wherein each of the plurality of layers of the sleeping surface which comprise cannabidiol, only comprise cannabidiol powder.

1302. The method of making the cannabidiol infused foam element of embodiment 1298, wherein each of the plurality of layers of the sleeping surface which comprise cannabidiol, only comprise cannabidiol particle.

1303. The method of making the cannabidiol infused foam element of embodiment 1298, wherein at least one of the plurality of layers of the sleeping surface which comprise cannabidiol, comprises a form of cannabidiol which differs from those of a remainder of the plurality of layers which comprise cannabidiol.

1304. The method of making the cannabidiol infused foam element of embodiment 1298, wherein the at least one of the plurality of layers of the sleeping surface which does not comprise the cannabidiol is a direct user contact layer.

1305. The method of making the cannabidiol infused foam element of embodiment 1299, wherein the at least one of the plurality of layers of the sleeping surface which does not comprise the cannabidiol is a direct user contact layer.

1306. The method of making the cannabidiol infused foam element of embodiment 1300, wherein the at least one of the plurality of layers of the sleeping surface which does not comprise the cannabidiol is a direct user contact layer.

1307. The method of making the cannabidiol infused foam element of embodiment 1301, wherein the at least one of the plurality of layers of the sleeping surface which does not comprise the cannabidiol is a direct user contact layer.

1308. The method of making the cannabidiol infused foam element of embodiment 1302, wherein the at least one of the plurality of layers of the sleeping surface which does not comprise the cannabidiol is a direct user contact layer.

1309. The method of making the cannabidiol infused foam element of embodiment 1303, wherein the at least one of the plurality of layers of the sleeping surface which does not comprise the cannabidiol is a direct user contact layer.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically, and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A cannabidiol infused foam element comprising cannabidiol and foam, wherein cannabidiol infused foam element is configured to at least partially bear a weight of a user contacting said foam.

2. The cannabidiol infused foam element of claim 1, wherein the foam comprises polyurethane foam, viscoelastic foam, latex foam, or combinations thereof.

3. The cannabidiol infused foam element of claim 2, wherein the cannabidiol infused foam element comprises a plurality of layers and at least one of the plurality of layers comprises the cannabidiol.

4. The cannabidiol infused foam element of claim 3, wherein the cannabidiol is located in a layer which will be directly contacted by said user.

5. The cannabidiol infused foam element of claim 3, wherein the cannabidiol is located in a layer which will not be directly contacted by said user.

6. The cannabidiol infused foam element of claim 3, wherein more than one of the plurality of layers is infused with cannabidiol.

7. The cannabidiol infused foam element of claim 3, wherein each of the plurality of layers is infused with cannabidiol.

8. The cannabidiol infused foam element of claim 3, wherein the cannabidiol comprises oil, powder, particle, or combinations thereof.

9. The cannabidiol infused foam element of claim 8, wherein the oil is encapsulated in beads.

10. The cannabidiol infused foam element of claim 9, wherein the beads are configured to break individually over a use life of the cannabidiol infused foam element.

11. The cannabidiol infused foam element of claim 9, wherein the beads are configured to not break individually over a use life of the cannabidiol infused foam element.

12. The cannabidiol infused foam element of claim 9, wherein a first set of beads is configured to break individually over a use life of the cannabidiol infused foam element and a second set of beads is configured to not break individually over the use life of the cannabidiol infused foam element.

13. The cannabidiol infused foam element of claim 3, wherein the cannabidiol infused foam element comprises a mattress, a pillow, a seating surface, or a sleeping surface.

* * * * *